United States Patent
Kawakami

(10) Patent No.: US 9,516,324 B2
(45) Date of Patent: Dec. 6, 2016

(54) IMAGE CAPTURING APPARATUS AND METHOD FOR CONTROLLING THE SAME

(71) Applicant: CANON KABUSHIKI KAISHA, Tokyo (JP)

(72) Inventor: Masashi Kawakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/739,524

(22) Filed: Jun. 15, 2015

(65) Prior Publication Data

US 2015/0365644 A1 Dec. 17, 2015

(30) Foreign Application Priority Data

Jun. 16, 2014 (JP) .................. 2014-123813
Apr. 17, 2015 (JP) .................. 2015-085387

(51) Int. Cl.
*H04N 19/156* (2014.01)
*H04N 5/77* (2006.01)
*H04N 9/80* (2006.01)
*H04N 9/804* (2006.01)

(52) U.S. Cl.
CPC ............ *H04N 19/156* (2014.11); *H04N 5/772* (2013.01); *H04N 9/8042* (2013.01)

(58) Field of Classification Search
CPC .. H04N 19/156; H04N 5/772; H04N 9/8042; H04N 1/32277; H04N 1/23236
USPC ................... 348/231.1, 222.1, 14.13
See application file for complete search history.

(56) References Cited

U.S. PATENT DOCUMENTS

2001/0036231 A1* 11/2001 Easwar ............... H04N 1/2112
375/240.19
2008/0239093 A1* 10/2008 Easwar ............... H04N 1/2112
348/222.1
2015/0334296 A1* 11/2015 Gunji .................. H04N 5/23229
348/222.1

FOREIGN PATENT DOCUMENTS

JP 2008-109195 A 5/2008

* cited by examiner

*Primary Examiner* — Nhan T Tran
(74) *Attorney, Agent, or Firm* — Cowan, Liebowitz & Latman, P.C.

(57) ABSTRACT

An image capturing apparatus comprises: an image-capturing unit acquiring RAW image data indicating a pre-development image from an image signal; recording unit encoding the RAW image data by a predetermined encoding method and recording the encoded RAW image data in a medium; a developing unit reading out the encoded RAW image data and developing the read encoded RAW image data; and a control unit comparing an amount of the encoded RAW image data that was recorded in a shooting time period with an amount of the encoded RAW image data that was read out from the medium so as to be used in development, and controlling an encoding method by which the RAW image data is encoded according to a comparison result.

13 Claims, 12 Drawing Sheets

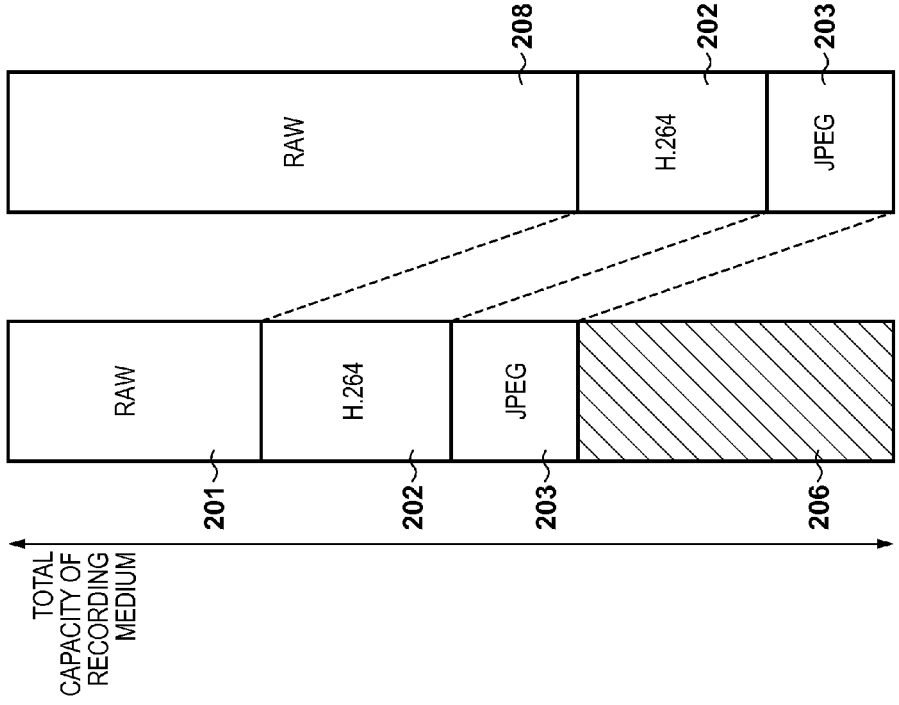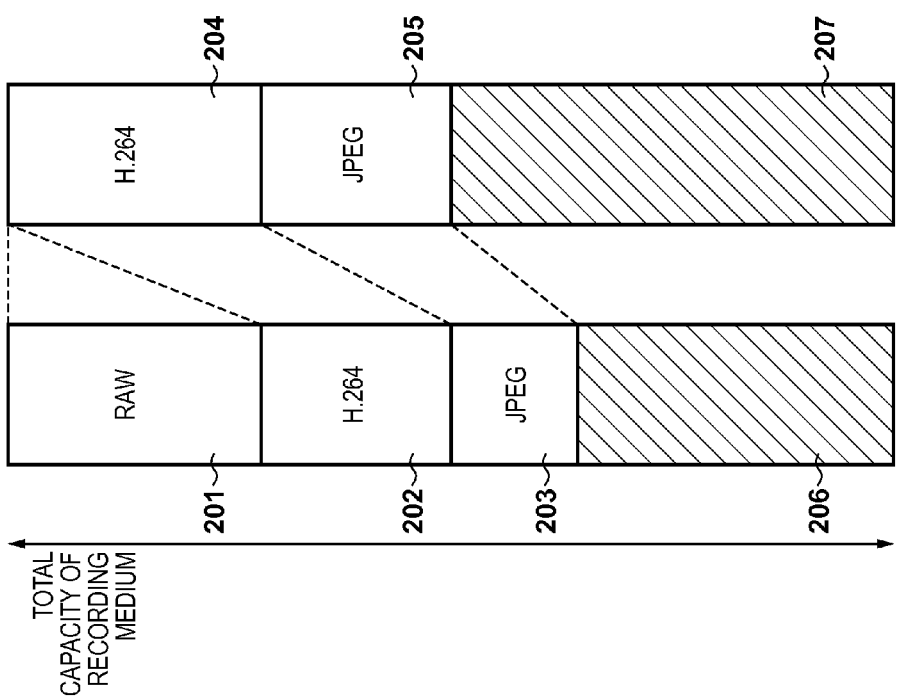

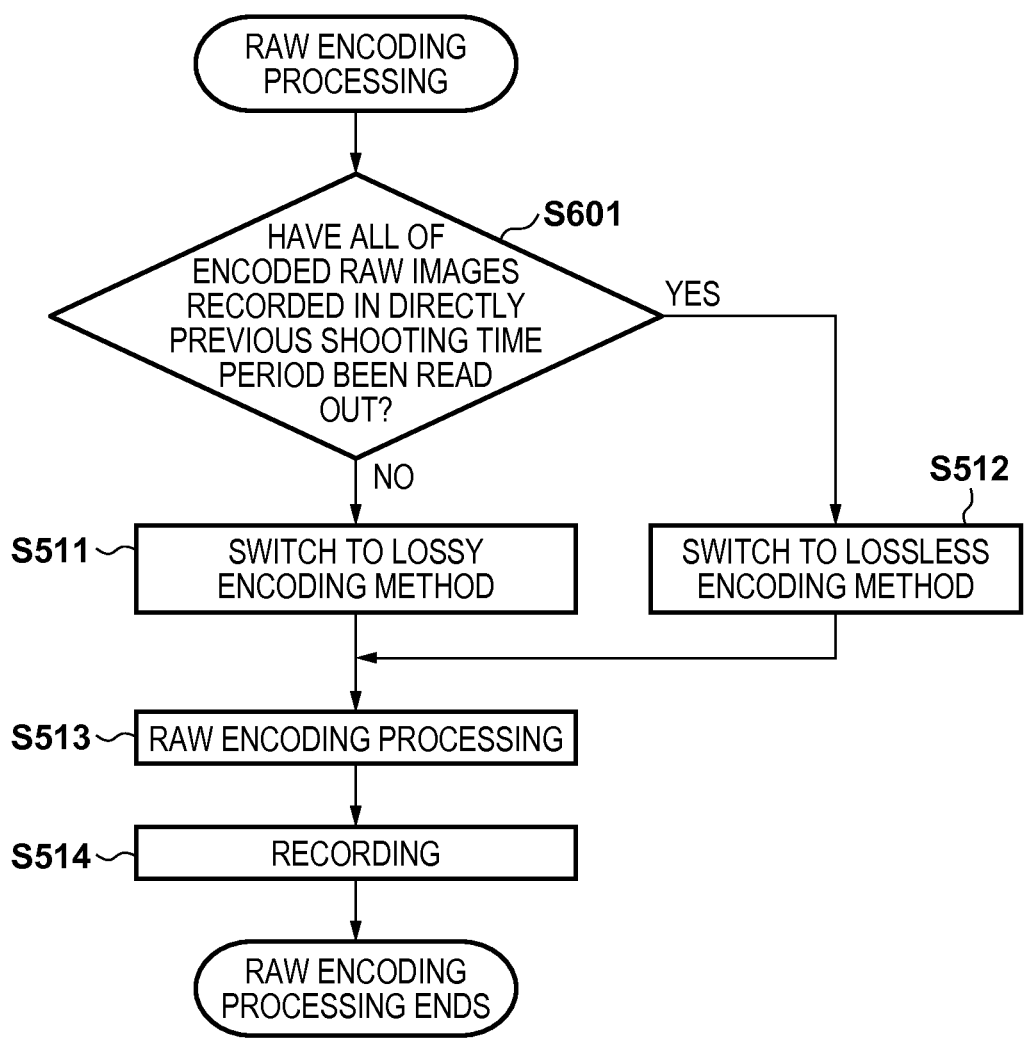

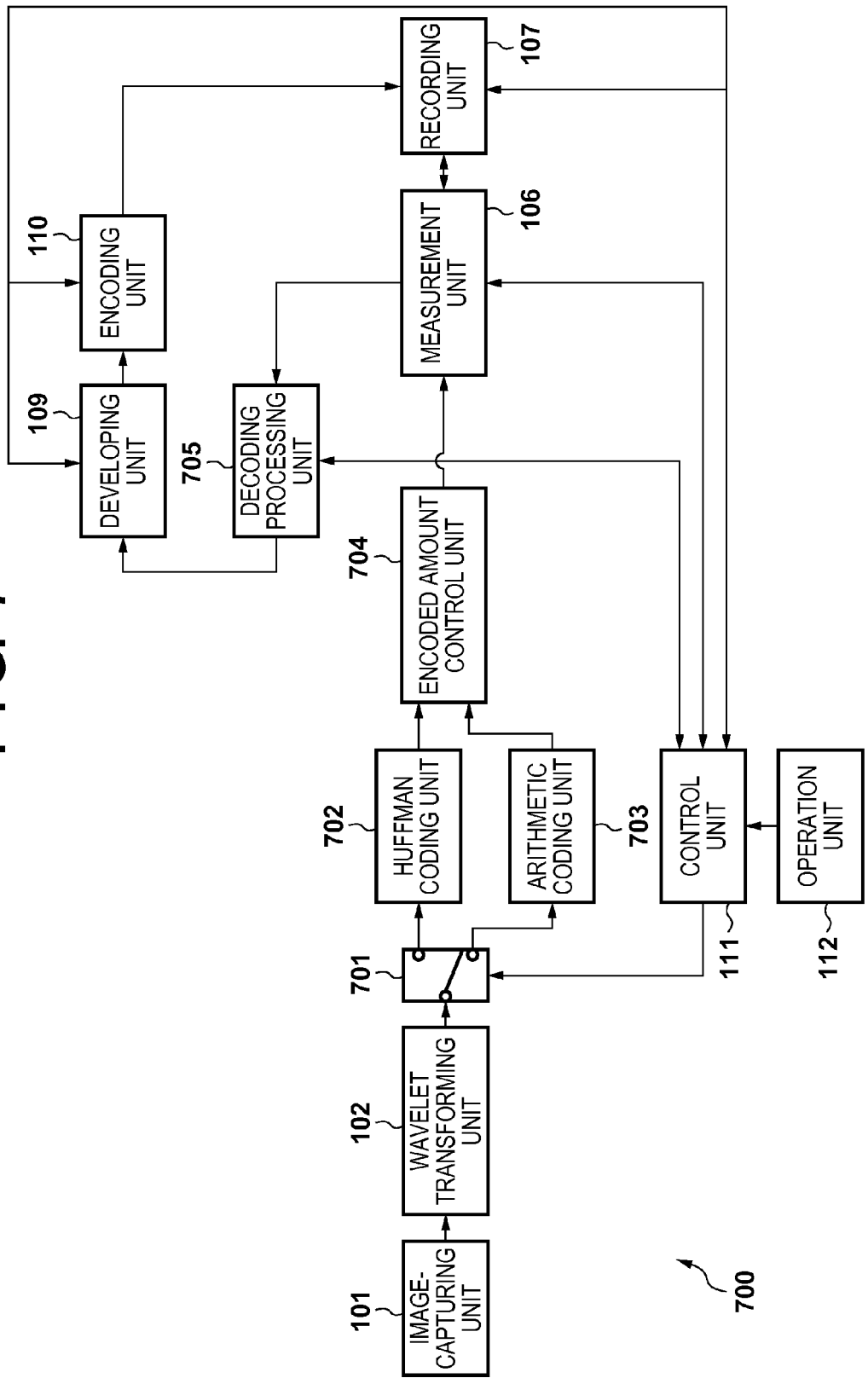

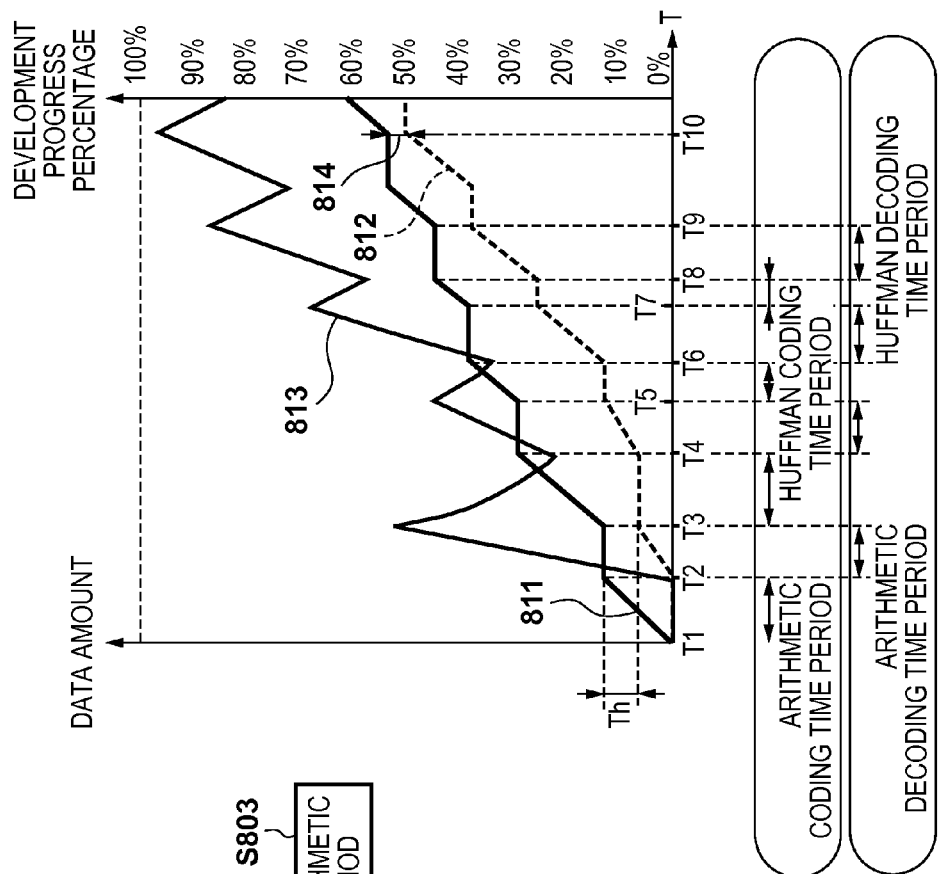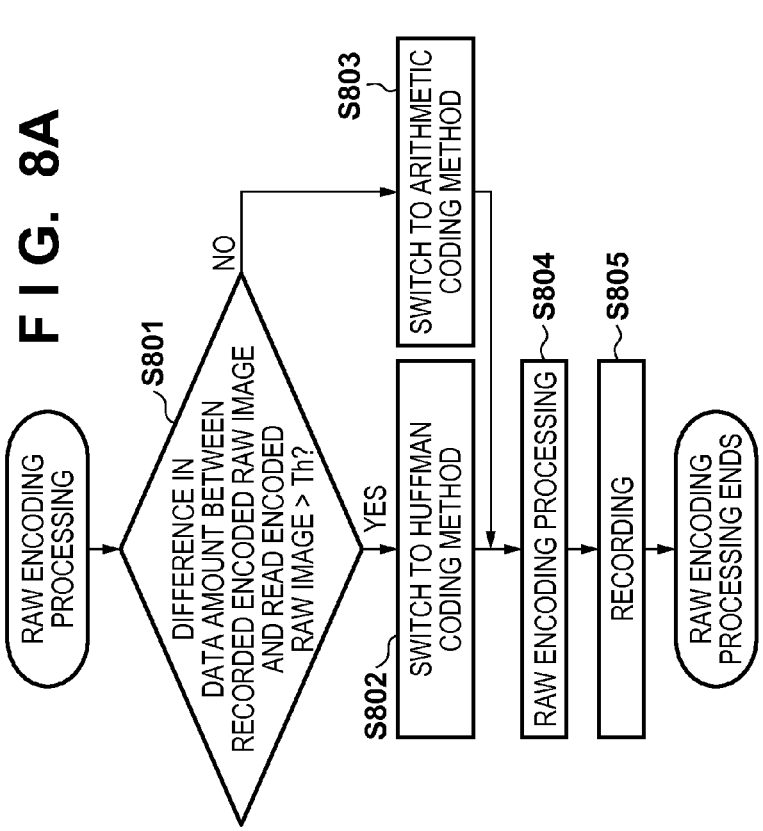

IMAGE CAPTURING APPARATUS AND METHOD FOR CONTROLLING THE SAME

BACKGROUND OF THE INVENTION

Field of the Invention

The present invention relates to an image capturing apparatus and a method for controlling the same, and particularly relates to a technique for recording video data.

Description of the Related Art

Conventional image capturing apparatuses such as digital cameras perform demosaicing processing on raw image signals (referred to as "RAW image") captured by an image sensor, convert the raw image signals into signals constituted by a luminance and a color difference, and subject each signal to development processing such as noise removal, distortion correction, and magnification chromatic aberration correction. The luminance signals and color difference signals that were ordinarily subjected to the development processing are compressed and encoded, and are recorded in a recording medium.

On the other hand, there are also image capturing apparatuses that can record RAW images. RAW images have an enormous amount of data that needs to be recorded, but have the advantages that degradation thereof can be suppressed to minimum and editing after image-capturing is possible, since RAW images are data on which no development processing has been performed and thus are not subjected to the above-described correction processing. In view of such advantages, RAW images are used on a priority basis in the field of business.

In recent years, due to an increase in the number of pixels of an image sensor and in the number of continuous shots per unit time, processing amounts of the above-described development processing performed on RAW images are synergistically increased, leading to an increase in the circuit size and power consumption that are needed for performing development processing in real time in parallel to image capturing.

Accordingly, image capturing apparatuses are known that distribute loads of development processing by performing development processing (referred to as "follow-up development processing") on RAW images recorded temporarily at the time of shooting in a state in which the processing load is relatively low, such as a stand-by state for waiting for a user operation or a shooting preparation state.

Ordinarily, since a RAW image has a large amount of data, compressing and encoding processing is performed on the RAW image so as not to suppress the capacity of a recording medium even when the RAW image is temporarily recorded. Therefore, the image capturing apparatus generates data (referred to as "encoded RAW image") obtained by encoding the RAW image, and then records the encoded RAW image. Note that when follow-up development processing is performed, the encoded RAW image is decoded and then subjected to development processing.

Meanwhile, various approaches have been made with respect to ordinary encoding techniques, and compression rates and processing times thereof are different from each other. Therefore, a technique in which a plurality of encoding techniques are switched and used according to the required property has been proposed. Specifically, a technique has been proposed in which adaptive switching between a lossless encoding method and a lossy encoding method is performed according to the content, which is a compression target, such as a text or a natural image, for each area (Japanese Patent Laid-Open No. 2008-109195).

Generally, follow-up development processing is performed when the apparatus waits for a user operation, such as in a period between shootings, in a reproduction mode, or in a sleep state. However, if shooting is continued at a regular interval or if continuous shooting, moving image shooting, or the like is performed for a prolonged time, there will be a lack of time for the follow-up development processing.

Change in the amount of data in a recording medium in which an encoded RAW image is recorded will be described with reference to FIGS. 2A to 2D. FIGS. 2A to 2D schematically show the amounts of data in the recording medium, in which shaded areas show the amounts of free space of the recording medium. FIGS. 2A and 2B show the change in the amount of data in the recording medium when a time for follow-up development processing is ensured and this follow-up development processing is executed. On the other hand, FIGS. 2C and 2D show the change in the amount of data in the recording medium when there is a lack of time needed for follow-up development processing.

In the recording medium immediately after shooting that is shown in FIG. 2A, an encoded RAW image 201 that was recorded at the time of shooting, and encoded moving image data 202 and encoded still image data 203 that were recorded before shooting are recorded, and a free space 206 is present. The encoded moving image data 202 is generated by decoding and developing the encoded RAW image and then encoding the decoded and developed RAW image with, for example, the H.264 encoding format. The encoded still image data 203 is generated by decoding and developing the encoded RAW image and then encoding the decoded and developed RAW image with the JPEG2000 format.

FIG. 2B shows the amounts of data in the recording medium after follow-up development processing is executed in the state of FIG. 2A. Moving image data of the encoded RAW image 201 is subjected to the H.264 format encoding processing and then added to the data amount of the encoded moving image data 202, serving as encoded moving image data 204. Still image data of the encoded RAW image 201 is subjected to the JPEG2000 format encoding processing and then added to the data amount of the encoded still image data 203, serving as encoded still image data 205. The encoded RAW image 201 is deleted from the recording medium at the time of being converted into H.264 or JPEG, and thus the data amount of the encoded RAW image 201 is 0 in FIG. 2B. Accordingly, the free space 206 of FIG. 2A is increased to a free space 207 of FIG. 2B.

FIG. 2C shows the amounts of data in the recording medium immediately after shooting of FIG. 2A. FIG. 2D shows the state of the recording medium in which the shooting is further continued from the state of FIG. 2C and there is a lack of time for performing follow-up development processing. Since the shooting is continued, an amount of data of a newly recorded encoded RAW image is added to the encoded RAW image 201, and the free space 206 of the recording medium is occupied by an encoded RAW image 208.

In contrast, it is conceivable to ensure a free space of the recording medium by encoding a RAW image using an encoding method having a predetermined property, for example, an encoding method having a high compression rate. However, ordinarily, an encoding method having a high compression rate needs an enormous amount of computation and, when, for example, a sufficient free space remains or high-speed decoding processing is desired to be performed, it may be desirable to use an encoding method that needs a small amount of computation or another appropriate encoding method. Accordingly, it is required to change the encoding method more flexibly in order to ensure a free space in the recording medium. However, Japanese Patent Laid-Open No. 2008-109195 relates to a configuration for changing the encoding method according to the content of a compression target, without taking into consideration changing the encoding method in order to ensure a free space in the recording medium.

SUMMARY OF THE INVENTION

The present invention has been made in consideration of the aforementioned problems, and realizes techniques for providing an image capturing apparatus, a method for controlling the same, and a program that can record data that was encoded using an appropriate encoding method selected according to a free space of a recording medium, making it possible to mitigate the occurrence of a lack of capacity of the recording medium.

In order to solve the aforementioned problems, the present invention provides an image capturing apparatus comprising: an image-capturing unit configured to acquire RAW image data indicating a pre-development image from an image signal that was captured by an image sensor; recording unit configured to encode the RAW image data by a predetermined encoding method and record the encoded RAW image data in a recording medium; a developing unit configured to read out the encoded RAW image data from the recording medium and develop the read encoded RAW image data; and a control unit configured to compare an amount of the encoded RAW image data that was recorded in a shooting time period by the image-capturing unit with an amount of the encoded RAW image data that was read out from the recording medium so as to be used in development by the developing unit, and to control an encoding method by which the RAW image data is encoded according to a comparison result.

In order to solve the aforementioned problems, the present invention provides control method of an image capturing apparatus having: an image-capturing step acquiring RAW image data indicating a pre-development image from an image signal that was captured by an image sensor; a recording step encoding the RAW image data by a predetermined encoding method and recording the encoded RAW image data in a recording medium; a developing step reading out the encoded RAW image data from the recording medium and developing the read encoded RAW image data; and a controlling step comparing an amount of the encoded RAW image data that was recorded in a shooting time period by the image-capturing unit with an amount of the encoded RAW image data that was read out from the recording medium so as to be used in development by the developing unit, and controlling an encoding method by which the RAW image data is encoded according to a comparison result.

According to the present invention, it is possible to record data that was encoded using an appropriate encoding method selected according to a free space of a recording medium, making it possible to mitigate the occurrence of a lack of capacity of the recording medium.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A to 2D are diagrams showing change in the amount of data in a recording unit when a RAW image is recorded.

FIG. 6 is a flowchart showing a sequence of operations of RAW encoding processing according to a second embodiment.

FIG. 7 is a block diagram showing an example of a functional configuration of a digital camera serving as an example of an image capturing apparatus according to a third embodiment.

FIG. 8A is a flowchart showing a sequence of operations of RAW encoding processing according to the third embodiment.

FIG. 8B is a diagram showing changes in the amount of data in a recording unit according to the third embodiment.

DESCRIPTION OF THE EMBODIMENTS

First Embodiment

Hereinafter, exemplary embodiments of the present invention will be described in detail with reference to the drawings. Note that the following will describe, as an example of an image capturing apparatus, an arbitrary digital camera that is capable of recording a RAW image and to which the present invention is applied. However, the present invention is not limited to the digital camera, and is also applicable to an arbitrary electronic device capable of recording a RAW image. Examples of the electronic devices may include a mobile phone, a game console, a tablet terminal, a personal computer, and information terminal in the shapes of a watch and glasses.

1-1 Configuration of Digital Camera 100

Figure 1:
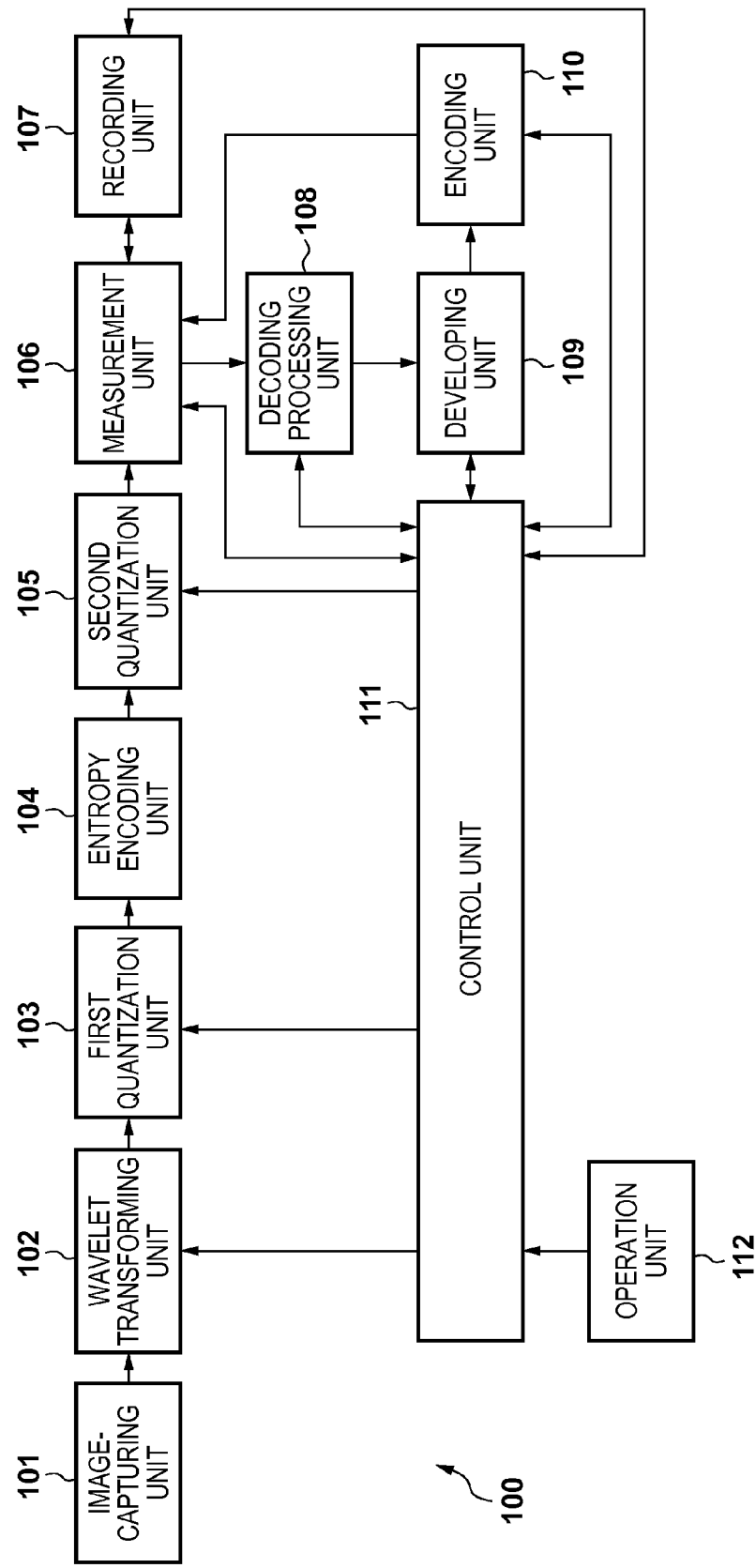
FIG. 1 is a block diagram showing an example of a functional configuration of a digital camera serving as an example of an image capturing apparatus according to an embodiment of the present invention.

FIG. 1 is a block diagram showing an example of a functional configuration of a digital camera 100 as an example of an image capturing apparatus of the present embodiment. Note that one or more functional block shown in FIG. 1 may be realized by hardware such as an ASIC or a programmable logic array (PLA), or may be realized by a programmable processor such as a CPU or MPU executing software. Furthermore, one or more functional block shown in FIG. 1 may also be realized by a combination of software and hardware. Accordingly, in the following description, even if different functional blocks are described as an operational subject, the same hardware may be realized as the subject.

An image-capturing unit 101 captures an optical image of a subject that has passed through color filters of red, green, and blue (RGB) that are provided on each pixel of an image sensor, performs analog/digital conversion on the captured image signal of the optical image of a subject using an A/D conversion circuit, and generates captured-image data. The image-capturing unit 101 outputs, as captured-image data, a raw digital image data (RAW image data) in units of pixels. The image sensor may be an image sensor such as a Charge-Coupled Device (CCD) image sensor or a Complementary Metal Oxide Semiconductor (CMOS) image sensor. Furthermore, the colors and the array that constitute the color filters may be, for example, a primary color Bayer array, but another arbitrary array may also be used.

Note that the image-capturing unit 101 may perform pixel restoring processing on the generated captured-image data. Here, the restoring processing includes processing for interpolating a defect pixel or a pixel having a low reliability value of the image sensor, that is, a pixel that is to be restored, using surrounding pixel values, processing for subtracting a predetermined offset value using, for example, a light-shielded pixel value of the image sensor, and the like. In the present embodiment, irrespective of whether or not correction processing or the like is performed, image data that has not virtually been developed is handled as RAW image data (or a RAW image) that indicates a pre-development image.

Furthermore, the image-capturing unit 101 may also perform compression of a bit length of the image data using an encoding technique such as a differential pulse code modulation (DPCM) when flowing the captured-image data to a data bus (not shown) in order to transmit the captured-image data to a downstream block. Accordingly, it is effective since the occupation amount of a bus bandwidth at the time of data transmission is reduced. In this case, compressed image data or decompressed image data thereof are also handled as belonging to the category of the above-described RAW image data.

A wavelet transforming unit 102 subjects the RAW image data that was input from the image-capturing unit 101 to frequency division using a low-pass filter and a high-pass filter, and divides the RAW image data into a low-frequency component and a high-frequency component. The wavelet transforming unit 102 performs conversion processing a set number of times, and outputs the converted data.

A first quantization unit 103 performs quantizing processing on the converted data output from the wavelet transforming unit 102. For example, by dividing the obtained converted data by a predetermined value and rounding the quotient off, the first quantization unit 103 deletes the frequency component that has a low influence, and further reduces the data amount. The first quantization unit 103 performs quantizing processing based on the control of a control unit 111. That is, the first quantization unit 103 does not perform quantizing processing if a lossless encoding method is applied, and performs quantizing processing if a lossy encoding method is applied, thereby reducing the data amount of the converted data. A quantization value for use in performing quantizing processing, that is, a value by which the converted data is divided is also input from the control unit 111. The first quantization unit 103 outputs quantized converted data.

An entropy encoding unit 104 performs variable length encoding on the converted data output from the first quantization unit 103, further performs data compression, and outputs the compressed data.

A second quantization unit 105 performs further compression processing on the data output from the entropy encoding unit 104 based on the control of the control unit 111. If the lossy encoding method is applied, processing for partially deleting data from the variable-length encoded data is performed so that the data does not exceed the target encoded amount. For example, information that is recognized with difficulty by human eyes even when it is displayed is partially deleted from the encoded data. Accordingly, the data amount is further reduced in the second quantization unit 105. If the lossless encoding method is applied, the entropy encoded data that was output from the entropy encoding unit 104 is directly output.

A measurement unit 106 measures an amount of data that is written by a recording unit 107 and an amount of data that is read out by the recording unit 107. Specifically, the measurement unit 106 measures an encoded amount of the encoded RAW image output from the second quantization unit 105, and an encoded amount of the encoded RAW image read out from the recording unit 107. Furthermore, the measurement unit 106 also measures an encoded amount of data that is output from an encoding unit 110 which will be described later. The measurement unit 106 holds all the measured amounts of data and outputs information on the amount of data that is measured to the control unit 111 as needed. The measurement unit 106 outputs the encoded RAW image data output from the second quantization unit 105 and the encoded data output from the encoding unit 110 to the recording unit 107, based on the control of the control unit 111. Then, the measurement unit 106 outputs the encoded RAW image data read out from the recording unit 107 to a decoding processing unit 108.

The recording unit 107 records the encoded RAW image that was input via the measurement unit 106 into a recording medium (not shown), reads out the encoded RAW image recorded in the recording medium, and outputs the read encoded RAW image to the measurement unit 106. The recording unit 107 is a recording medium for recording shot images and data associated therewith, and is constituted by a memory medium, such as a semiconductor memory or a magnetic disc that are included in the apparatus, or a memory card that is detachable from the apparatus. Note that the recording unit 107 may be a temporary storage element such as a DRAM. The recording unit 107 reads out the encoded RAW image recorded in the recording medium in accordance with an instruction of the control unit 111.

The decoding processing unit 108 performs processing for decoding an encoded RAW image input via the measurement unit 106, and outputs the decoded data to a developing unit 109.

The developing unit 109 performs demosaicing processing on the decoded RAW image output from the decoding processing unit 108 to convert the decoded RAW image into signals each constituted by a luminance and a color difference, and performs development processing such as removal of noise included in each signal, and correction of distortion and magnification chromatic aberration that are included in each signal. The developing unit 109 outputs the developed RAW image data (developed RAW image) to the encoding unit 110.

The encoding unit 110 performs encoding processing represented by MPEG2, H.264, and the like if the developed RAW image output from the developing unit 109 is a moving image, whereas it performs encoding processing represented by JPEG, JPEG2000, and the like if the developed RAW image is a still image. When the encoding unit 110 outputs the data subjected to the encoding processing to the measurement unit 106, the data is recorded by the recording unit 107 via the measurement unit 106 based on the control of the control unit 111. At that time, upon completion of the recording of the encoded data, the recording unit 107 deletes the encoded RAW image, which serves as the original data of the encoded data, from the recording unit 107 based on the control of the control unit 111.

The control unit 111 is, for example, a CPU or MPU, and a control unit that performs overall control of the digital camera 100 by expanding a program stored in the ROM onto a work area of the RAM and executing the program. The control unit 111 controls entire follow-up development processing, which will be described later.

An operation unit 112 is constituted by buttons, a touch panel, and the like that detect an operational instruction of a user, such as shooting, recording, or reproduction, and notifies the control unit 111 of the detected operational instruction. The control unit 111 controls the constituent components so that the content of the operational instruction given by the user is realized.

1-2 Summary of Follow-Up Development Processing

Changes in data amount of the recording unit 107 when a RAW image encoded by shooting is recorded and follow-up development processing is performed will be described with reference to FIGS. 3A and 3B. "Follow-up development" according to the present embodiment refers to development processing that is performed during an idling period after recording of the encoded RAW image data or in a back ground of another processing after recording.

Figure 3A:
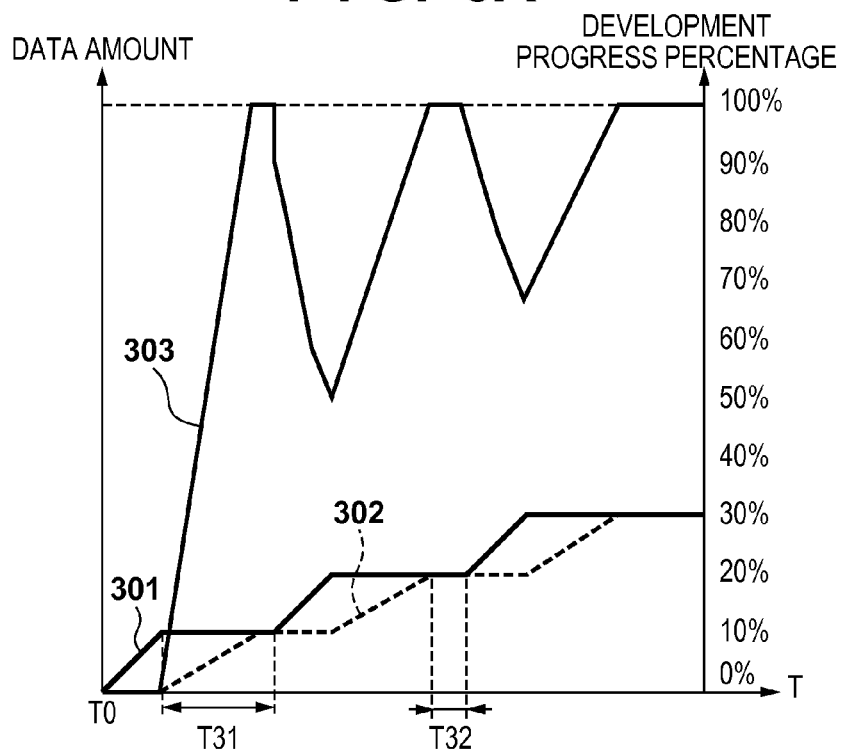
FIGS. 3A and 3B are diagrams showing changes in the amount of data in the recording unit when follow-up development processing according to the present embodiment is executed.
Figure 3B:
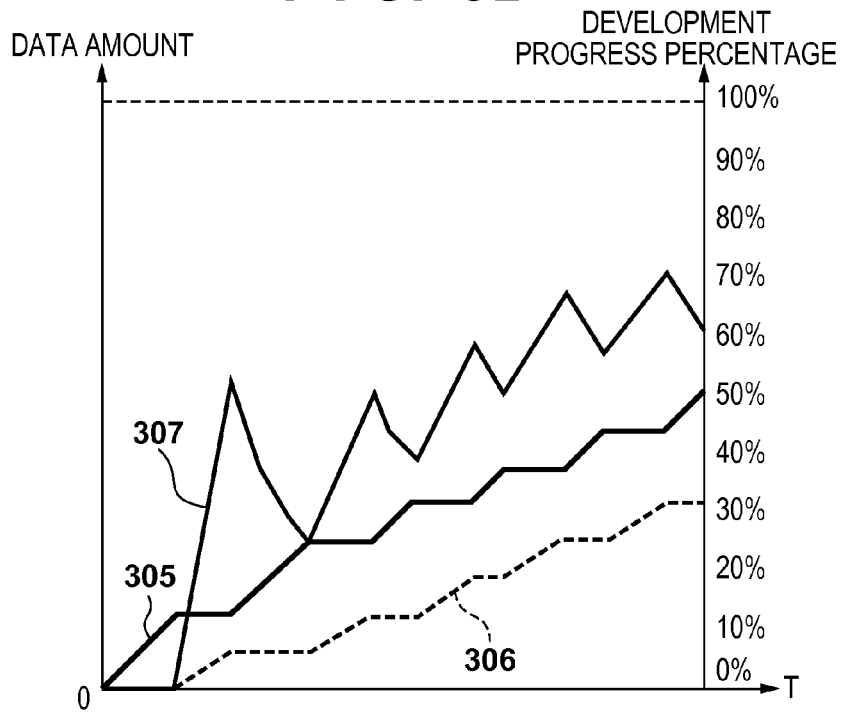

FIG. 3A shows an example of the changes in data of the recording medium in the recording unit 107 when there is a sufficient time for reading out an encoded RAW image from the recording unit 107 and performing development processing thereon. In contrast, FIG. 3B shows an example of the changes in data of the recording medium in the recording unit 107 when there is not a sufficient time for reading out an encoded RAW image and performing development processing thereon. Here, an encoded RAW image data amount 301 indicates an amount of data of the encoded RAW image recorded by the recording unit 107. Furthermore, a follow-up developed data amount 302 indicates the sum of amounts of data of the encoded RAW image read out from the recording unit 107. The left vertical axis indicates the amount of data, and the right vertical axis indicates the development progress percentage, which will be described later, and the horizontal axis is a time axis.

"Development progress percentage" refers to a percentage obtained by the following formula: follow-up developed data amount/encoded RAW image data amount×100 and, if the percentage is 100%, this will mean that all the encoded RAW images that are recorded are read out, decoded, and developed, and are subjected to moving image encoding or still image encoding, that is, the follow-up development is making progress without delaying. In contrast, if the percentage is 0%, this will mean that all the encoded RAW images that are recorded remain in the recording unit 107 and the follow-up development is delayed.

As shown in FIG. 3A, when shooting starts at time T0, the encoded RAW image data amount 301, which indicates the sum of the amounts of data of recorded encoded RAW image, increases. To be exact, the encoded RAW image data amount 301 increases discretely at the time of shooting of a still image, but here increases linearly, for ease of illustration.

Time period T31 in which the encoded RAW image data amount 301 has a constant value is a non-shooting time period in which no shooting is performed. In time period T31, the follow-up developed data amount 302 increases since follow-up development processing is executed. Although it is not illustrated in FIGS. 3A and 3B, an encoded RAW image temporarily recorded by the recording unit 107 is deleted from the recording unit 107 after the follow-up development processing. Therefore, the amount of the encoded RAW image data that is recorded in the recording unit 107 decreases by the same data amount as the increase in the follow-up developed data amount 302. For example, when all the encoded RAW images recorded during shooting have been read out while no shooting is performed (in time period T31), the encoded RAW image data amount 301 and the follow-up developed data amount 302 match each other.

Non-shooting time period T32 is a time period in which the encoded RAW image data amount recorded at the time of shooting and the follow-up developed data amount match each other. In other words, the recording unit 107 in time period T32 is in the state shown in FIG. 2B, that is, the state in which all the recorded encoded RAW images have been subjected to decoding processing and development processing. The still image data or moving image data that was subjected to the development processing are compressed and encoded so as to be recorded in the recording unit 107. Furthermore, when the compressed and encoded data is recorded by the recording unit 107, the original encoded RAW image is deleted from the recording unit 107. The development progress percentage 303 in time period T32 is 100%, indicating that the follow-up development is making progress excellently.

Hereinafter, an example in which there is not a sufficient time for the follow-up development processing will be described with reference to FIG. 3B. If there is not a sufficient time for follow-up development processing, the development progress percentage 307 is not 100%, and the state is realized in which a difference between the encoded RAW image data amount 305 and the follow-up developed data amount increases. In other words, the recording unit 107 is in the state shown in FIG. 2D, that is, the state in which the ratio of the encoded RAW image to the recording unit 107 increases. If this state is continued, the encoded RAW image may occupy the capacity of the recording unit 107 and it may be difficult for the digital camera 100 to continue shooting.

In the present embodiment, even if there is not a sufficient time for follow-up development processing, the encoded RAW image data amount in the recording unit 107 is reduced by switching the encoding method to be applied depending on the state in which encoded data is recorded. Specifically, if a difference between the amount of recorded encoded RAW image data and the amount of data subjected to the follow-up development exceeds a predetermined amount of data, the encoding method is switched from a lossless encoding method (first encoding method) to a lossy encoding method (second encoding method). If the lossy encoding method according to the present embodiment is applied, the amount of data is decreased by the processing of the first quantization unit 103 and the second quantization unit 105, and thus the amount of the generated encoded RAW image data can be reduced as compared with the case where the lossless encoding is applied. That is, if the amount of the encoded RAW image data that is recorded in the recording unit 107 differs from the amount of data that was subjected to the follow-up development, the control unit 111 selects the lossy encoding method that has a higher compression rate than usual, suppressing an increase in the amount of the encoded RAW image data. Therefore, it is possible to mitigate the occurrence of a lack of capacity of the recording unit 107 depending on the state in which the encoded data is recorded.

The amount of data in the recording unit 107 when the encoding method is switched between the lossless encoding method and the lossy encoding method will be described with reference to FIGS. 4A and 4B.

Figure 4A:
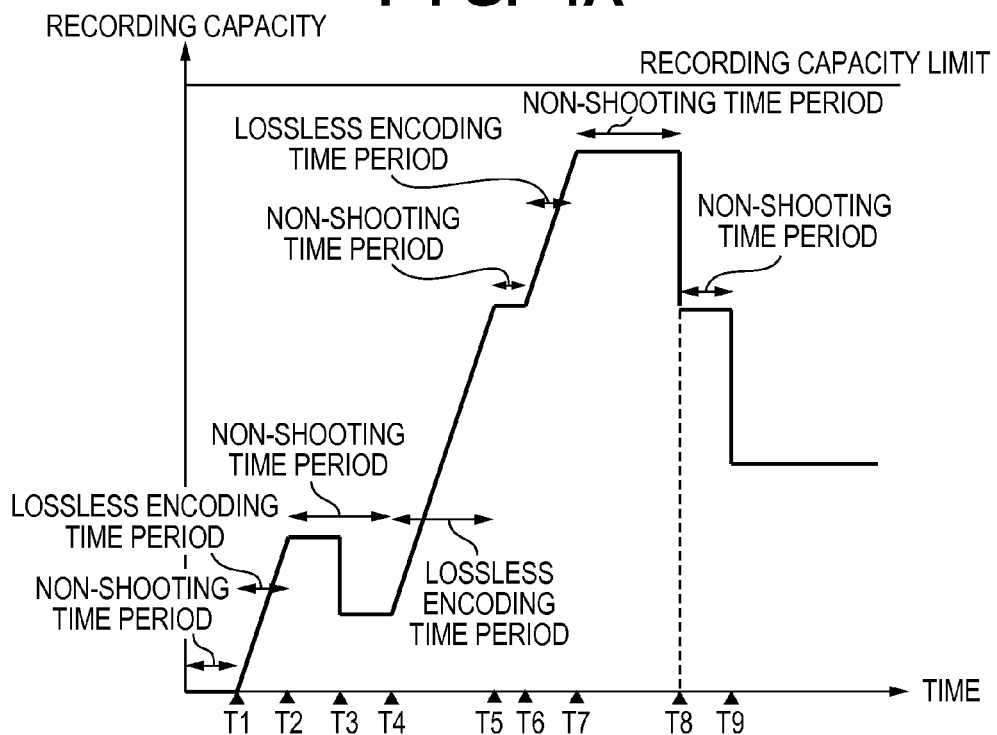
FIGS. 4A and 4B are diagrams showing changes in the amount of data in the recording unit when, in the follow-up development processing according to the present embodiment, switching between a lossless encoding method and a lossy encoding method is performed.

First, changes in the amount of data in the recording unit 107 when the data is encoded by the lossless encoding method are shown in FIG. 4A. The non-shooting time period until time T1 shows a time period in which no shooting is performed. The time period from time T1 to time T2 is a shooting time period in which an encoded RAW image that is lossless-encoded is recorded in the recording unit 107. The time period from time T2 to time T4 is a non-shooting time period, and thus when follow-up development processing starts with respect to the encoded RAW image recorded in the recording unit 107 at time T2, the follow-up development processing ends at time T3. The state is realized in which all the encoded RAW images in the recording unit 107 are decoded and encoded and the encoded data such as JPEG or H.264 is recorded.

The shooting starts at time T4 and temporarily stops at time T5, but the shooting restarts at time T6 and continues to time T7. In the non-shooting time period from time T5 to time T6, the control unit 111 executes the follow-up development processing on encoded RAW images shot between time T4 and time T5, but there is not a sufficient time, and thus the encoded RAW image data amount increases due to shooting restarted at time T6. In the non-shooting time period from time T7 to time T8, the control unit 111 continues to execute the follow-up development processing on the encoded RAW images shot between time T4 and time T5. The follow-up development processing is executed continuously to time T9, and at time T9, the state is realized in which the follow-up development processing has been performed on encoded RAW images shot between time T6 and time T7. At time T7, the encoded RAW image data amount increases approaching to the limit of the recording capacity. If shooting is further performed, recording of the encoded RAW image may fail due to the occurrence of a lack of the capacity of the recording unit 107.

Figure 4B:
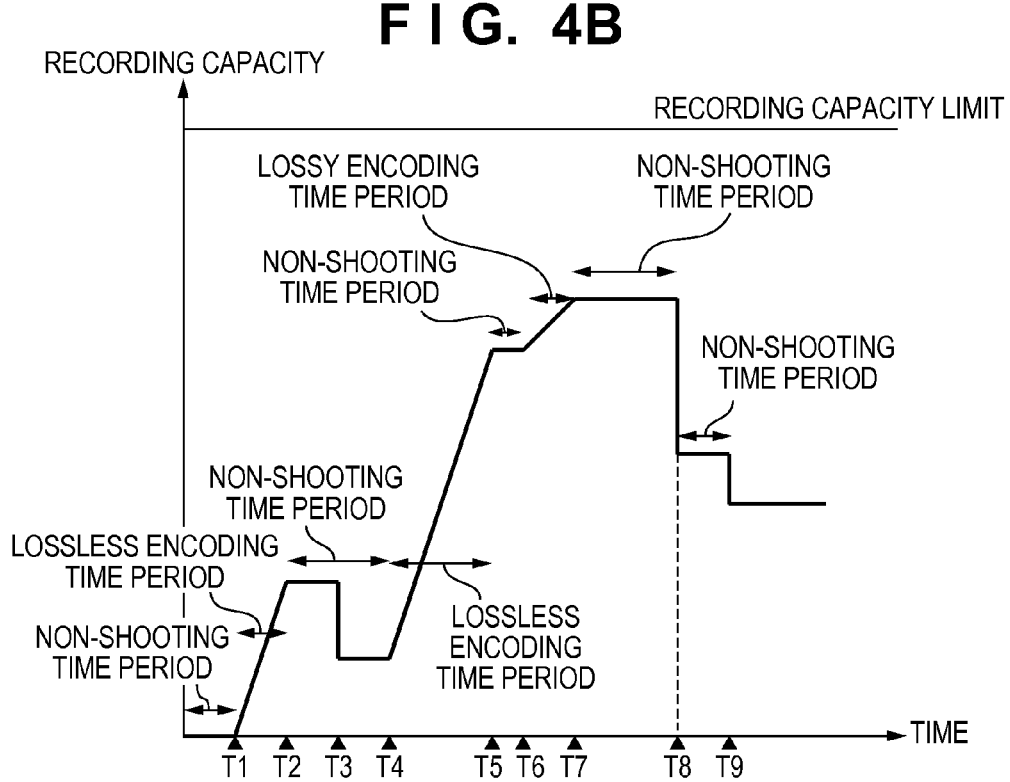

On the other hand, changes in the amount of data in the recording unit 107 when the lossy encoding method is applied are as shown in FIG. 4B. The changes until time T6 is the same as that of FIG. 4A. At that time, encoded RAW images are accumulated by shooting until time T5, and there is a difference in the amount of data between the encoded RAW images and the data subjected to the follow-up development processing. Therefore, the control unit 111 applies the lossy encoding method when shooting is restarted at time T6. This reduces the amount of the encoded RAW image data recorded in the shooting time period from time T6 to time T7, making it possible to mitigate the occurrence of a lack of capacity of the recording unit 107 relative to the case of FIG. 4A.

1-3 Sequence of Operations of Follow-Up Development Processing

Hereinafter, a sequence of operations of follow-up development processing will be described with reference to FIG. 5. Note that the follow-up development processing in the present embodiment starts when, for example, a power button included in the operation unit 112 of the digital camera 100 is pressed in the state in which the digital camera 100 is in the OFF state and the digital camera 100 is activated. Furthermore, this processing is realized by the control unit 111 expanding a program stored in the ROM onto the work area of the RAM and executing it. Note that in the present embodiment, the lossless encoding method is set as default for an encoding method in order to perform encoding processing at a higher speed.

In step S501, the control unit 111 determines whether or not the digital camera 100 has been powered off, based on the notification of the operation unit 112. If it is determined that the digital camera 100 has not been powered off, the procedure advances to step S502. On the other hand, the case where it is determined that the digital camera 100 has been powered off will be described at the end of the description of the present operation.

In step S502, the control unit 111 determines whether or not shooting was instructed by a user based on the notification by the operation unit 112. If shooting was instructed, the control unit 111 starts shooting and advances the procedure to step S510 in order to execute RAW encoding processing, whereas if shooting was not instructed, the control unit 111 advances the procedure to step S503.

In step S503, the control unit 111 determines, based on information on the capacity that can be obtained from the recording unit 107, whether or not an encoded RAW image is included in the recording medium of the recording unit 107. If no encoded RAW image is included in the recording medium of the recording unit 107, the control unit 111 returns the procedure again to step S501 since there is no target for decoding processing. On the other hand, if an encoded RAW image is included in the recording medium of the recording unit 107, the control unit 111 advances the procedure to step S504 in order to execute decoding and development processing on the encoded RAW image.

In step S504, the recording unit 107 reads out the encoded RAW image from the recording medium and outputs the read encoded RAW image to the measurement unit 106, based on the control of the control unit 111. The read encoded RAW image is input into the decoding processing unit 108 via the measurement unit 106.

In step S505, the decoding processing unit 108 performs decoding processing on the read encoded RAW image based on the control of the control unit 111. The decoding processing that corresponds to the lossless encoding method or the lossy encoding method that is designated by the control unit 111 is performed. Upon completion of the decoding processing, the decoding processing unit 108 advances the procedure to step S506.

In step S506, the developing unit 109 performs development processing on the decoded RAW image based on the control of the control unit 111. As described above, the developing unit 109 performs demosaicing processing on the decoded RAW image that was input from the decoding processing unit 108 to convert the decoded RAW image into signals each constituted by a luminance and a color difference, and performs processing such as noise removal, distortion correction, and magnification chromatic aberration correction.

In step S507, the encoding unit 110 performs encoding processing on the developed RAW image based on the control of the control unit 111. The encoding unit 110 performs, for example, still image encoding processing such as JPEG encoding if the developed RAW image is a still image, whereas moving image encoding processing such as H.264 if the developed RAW image is a moving image, in accordance with the encoding method instructed by the control unit 111.

In step S508, the recording unit 107 records the encoded data that was encoded in the recording medium based on the control of the control unit 111. Since the encoded data encoded by the encoding unit 110 is input into the recording unit 107 via the measurement unit 106, the measurement unit 106 measures the data amount of the encoded data that is recorded in the recording unit 107, and the measured value is stored. The measured value is notified to the control unit 111 from the measurement unit 106 when the measurement of the measurement unit 106 is completed, or is notified by the measurement unit 106 in response to a request from the control unit 111.

In step S509, the recording unit 107 deletes, from the recording medium, the encoded RAW image that was subjected to the follow-up development processing, that is, the encoded RAW image read out from the recording unit 107, based on the control of the control unit 111.

The following will describe the RAW encoding processing shown in steps S510 to S514, that is, processing in which the RAW encoding processing is performed by switching the RAW encoding method and the encoded RAW image is recorded in the recording unit 107.

In step S510, the control unit 111 compares, based on the measured value acquired from the measurement unit 106, the total amount of data of the encoded RAW images recorded by the recording unit 107 with the total amount of data of the encoded RAW images read out from the recording unit 107. Then, it is determined whether or not a difference in the total amount of data between the recorded encoded RAW image and the encoded RAW image read out from the recording unit 107 is larger than a threshold Th that is predetermined based on experimentations or the like. If the calculated difference is larger than the threshold Th, the control unit 111 determines that the follow-up development processing has not sufficiently been performed, and advances the procedure to step S511 in order to apply the lossy encoding method. On the other hand, if the calculated difference is the threshold Th or less, the control unit 111 determines that the follow-up development processing has sufficiently been performed, and advances the procedure to step S512 in order to apply the lossless encoding method.

In step S511, the control unit 111 switches the mode to the lossy encoding method if the lossless encoding method is set as the encoding method. Furthermore, in order to apply the lossy encoding method, the control unit 111 controls the first quantization unit 103 and the second quantization unit 105 so as to apply encoding processing. As described above, if the follow-up development processing has not sufficiently been performed, an encoding method capable of reducing the amount of data is set, and the amount of data of the encoded RAW image that is recorded in the recording unit 107 is reduced.

In step S512, the control unit 111 switches the mode to the lossless encoding method if the lossy encoding method is set as the encoding method. Furthermore, in order to apply the lossless encoding method, the control unit 111 controls the first quantization unit 103 and the second quantization unit 105 so as not to apply compression processing. If the follow-up development processing has sufficiently been performed, an encoding method is set that has a smaller amount of computation and a higher speed, although an encoded RAW image that is recorded in the recording unit 107 has a larger amount of data in this encoding method.

In step S513, the control unit 111 controls the constituent components including the wavelet transforming unit 102 to the second quantization unit 105 shown in FIG. 1 to perform encoding processing on the RAW image, and generates an encoded RAW image.

In step S514, the control unit 111 records the encoded RAW image into the recording unit 107, and returns, upon completion of the recording, the procedure again to step S501.

In step S501, if it is determined that the digital camera 100 has been powered off, the control unit 111 powers the digital camera 100 off, and ends the sequence of operations of follow-up development processing.

In the present embodiment, if it is not possible to ensure a sufficient time for follow-up development processing, an encoding method having a higher compression rate among selectable encoding methods will be set. Determination as to whether or not a sufficient time for the follow-up development processing can be ensured is made based on a relationship between the total amount of data of the encoded RAW image recorded in the recording unit 107 and the total amount of data subjected to the follow-up development. Specifically, if a difference between the total amount of data of the encoded RAW image recorded by the recording unit 107 and the total amount of data of the encoded RAW image that was read out exceeds a predetermined value, it is determined that this is the case where a sufficient time for follow-up development processing cannot be ensured, and the lossy encoding method having a higher compression rate is set. Accordingly, it is possible to record data that was encoded using an appropriate encoding method selected according to a free space of the recording medium, and mitigate the occurrence of a lack of capacity of the recording medium.

Second Embodiment

Hereinafter, a second embodiment according to the present invention will be described. In the first embodiment, the lossy encoding method that has a higher compression rate than that of the lossless encoding method is set if a difference between the total amount of data of an encoded RAW image that was recorded by the recording unit 107 and the total amount of data of a read encoded RAW image exceeds a threshold. In contrast, in the second embodiment, the lossy encoding method is set depending on whether or not the total amount of data of encoded RAW images recorded in a shooting time period directly previous to the non-shooting time period has been read out within the non-shooting time period. Therefore, the configuration of the digital camera 100 shown in FIG. 1 is equivalent, and follow-up development processing of the present embodiment has the same configuration except for a configuration of setting of an encoding method. Note that the same reference numerals are given to the same configurations, and redundant descriptions thereof are omitted while describing mainly differences.

2-1 Sequence of Operations of RAW Encoding Processing

The operation of follow-up development processing according to the second embodiment will be described. Note that as described above, the follow-up development processing has the same configuration as that of the first embodiment, except for a configuration of setting an encoding method. Therefore, only differences in RAW encoding processing will be described with reference to FIG. 6. Note that the RAW encoding processing is executed if it is determined in step S502 shown in FIG. 5 that shooting of the digital camera 100 was instructed.

In step S601, the control unit 111 determines whether or not all the data of encoded RAW images recorded by the recording unit 107 in a shooting time period have been read out in a non-shooting time period immediately after this shooting time period, and have been subjected to follow-up development processing. The control unit 111 compares, based on the measured value obtained by the measurement unit 106, the amount of data of the encoded RAW images recorded in the shooting time period with the amount of data of the encoded RAW images read out in the non-shooting time period immediately after the shooting time period. If all the encoded RAW images could not be read out within the non-shooting time period, it is determined that there was not a sufficient time for the follow-up development processing and the procedure advances to step S511, where the lossy encoding method is set. Accordingly, an increase in data of encoded RAW images that are generated by shooting is suppressed. On the other hand, if all the encoded RAW images could be read out within the non-shooting time period, it is determined that there was a sufficient time for the follow-up development processing, and the procedure advances to step S512, where the lossless encoding method is set.

Figure 5:
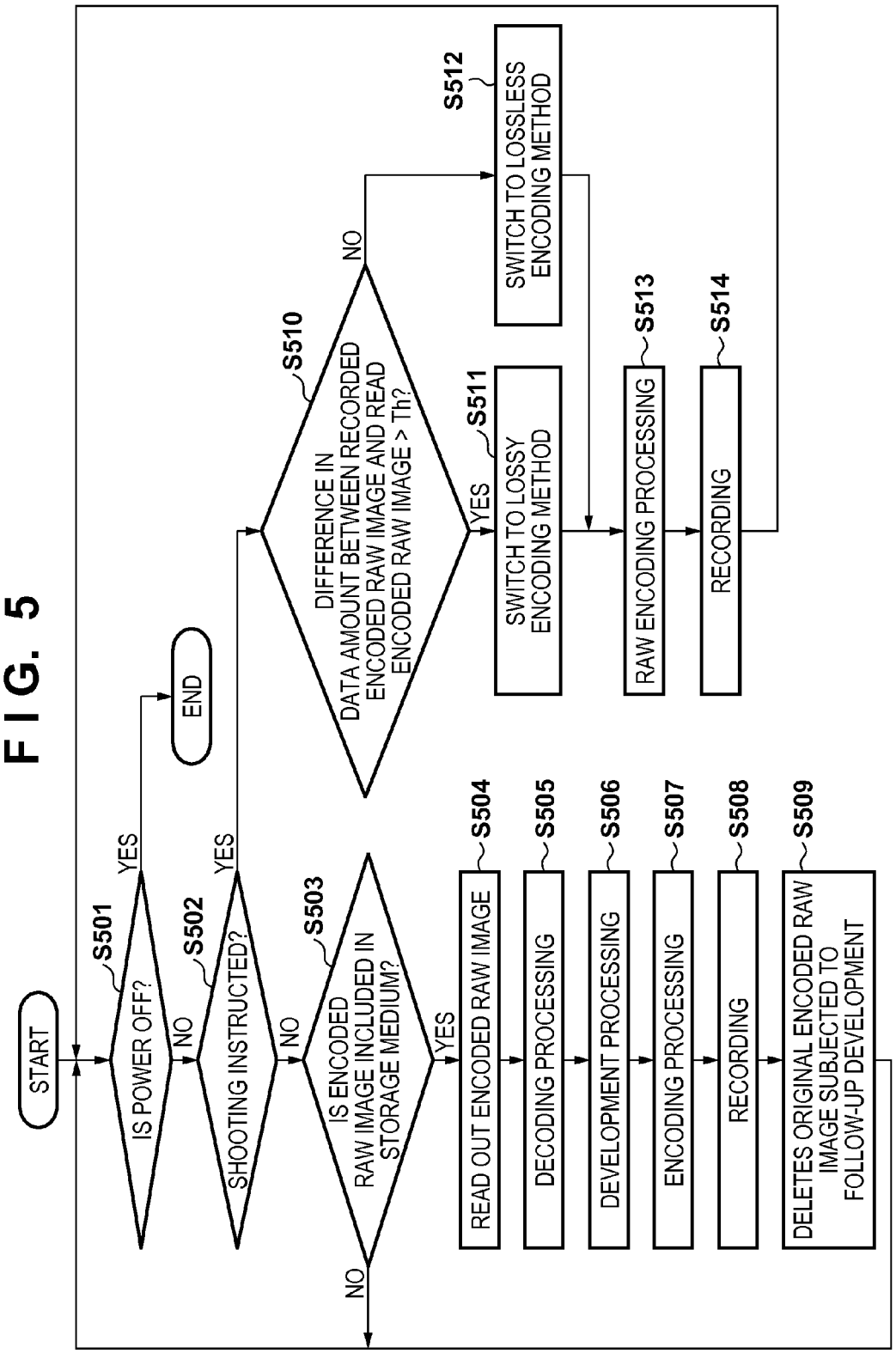
FIG. 5 is a flowchart showing a sequence of operations of the follow-up development processing according to a first embodiment.

The processes thereafter (that is, steps S511 to S514) are the same as those shown in FIG. 5, and thus descriptions thereof are omitted.

In the present embodiment, the lossy encoding method, that is, an encoding method having a higher compression rate is set depending on whether or not all the pieces of data of the encoded RAW images recorded in the shooting time period were subjected to the follow-up development processing in the non-shooting time period immediately after the shooting time period. With this configuration, similarly to the first embodiment, it is possible to record data that was encoded using an appropriate encoding method selected according to a free space of the recording medium, making it possible to mitigate the occurrence of a lack of capacity of the recording medium. Furthermore, by checking completion of the follow-up development processing for each shooting time period, if a difference between the amount of data of an encoded RAW image and the amount of data subjected to the follow-up development processing occurs, it is possible to control an encoding method having a high reaction speed.

Third Embodiment

Hereinafter, a third embodiment according to the present invention will be described. In the first embodiment, if a sufficient time for follow-up development processing cannot be ensured, the lossy encoding method that has a higher compression rate, from among the lossless encoding method and the lossy encoding method, will be set. In contrast, in the third embodiment, from among the whole encoding and decoding processing including decoding processing, an encoding method that has a higher effect of deleting the amount of data will be selected. More specifically, an arithmetic coding method (first encoding method) and a Huffman coding method (second encoding method), which are two selectable encoding methods, are set in a selectable manner in view of the above description. Therefore, follow-up development processing of the present embodiment has the same configuration as that of the first embodiment, except for a configuration of performing RAW encoding processing. Note that the same reference numerals are given to the same configurations, and redundant descriptions thereof are omitted while describing mainly differences.

3-1 Configuration of Digital Camera 700

Entropy encoding is known as a category of encoding methods. There is a plurality of entropy encoding methods, and an arithmetic coding method is one of the types. The arithmetic coding method of entropy encoding is a high-compression method, and is also adopted in a compression standard such as JPEG2000 or H.264. As another one of the entropy encoding methods, a Huffman coding method of entropy encoding is also known. The Huffman coding method is adopted in a compression standard such as MPEG2.

The arithmetic coding is high-compression method, but needs an enormous processing time because it needs processing for updating occurrence probability for each bit of intermediately encoded data that is generated during encoding, and parallelization is difficult due to the property of its algorithm. The decoding processing also has an enormous processing time. On the other hand, the Huffman coding can perform high speed encoding and decoding processing although it has a lower compression rate than that of the arithmetic coding.

The following will describe an example of a functional configuration of the digital camera 700 serving as an example of the image capturing apparatus of the present embodiment with reference to FIG. 7. However, the blocks denoted by the reference numerals of FIG. 1 are the same as the blocks shown in FIG. 1 and thus descriptions thereof are omitted.

A switch 701 is a switch for outputting the converted data output from the wavelet transforming unit 102 to a Huffman coding unit 702 or an arithmetic coding unit 703, based on the control of the control unit 111.

The Huffman coding unit 702 performs Huffman coding processing on the input converted data, and outputs the Huffman-coded data to the arithmetic coding unit 703.

The arithmetic coding unit 703 performs arithmetic coding processing on the input converted data and outputs the arithmetic-coded data to an encoded amount control unit 704.

The encoded amount control unit 704 performs processing for suppressing the encoded amount to a target encoded amount. The encoded amount control unit 704 reduces the encoded data amount by partially deleting input Huffman-coded data or arithmetic-coded data. For example, information that can be recognized with difficulty by human eyes even when it is displayed is partially deleted from the encoded data. If lossless encoding is set for the RAW encoding, the encoded amount control unit 704 does not delete the encoded data. The encoded RAW image generated by the encoded amount control unit 704 is recorded in the recording unit 107 via the measurement unit 106.

Note that the foregoing configuration needs only encoding methods, such as methods performed by the Huffman coding unit 702 and the arithmetic coding unit 703, that have different properties in terms of decoding processing, and other configurations may be configurations other than the above-described one. Furthermore, the encoding methods are examples and another encoding method having a different encoding rate is also applicable, and the present invention is not limited to the two encoding methods as long as there is a plurality of encoding methods.

The decoding processing unit 705 decodes the encoded RAW image output from the measurement unit and generates a decoded RAW image. The generated decoded RAW image is output to the developing unit 109. The decoding processing unit 705 includes a Huffman decoding unit and an arithmetic decoding unit that are not shown. The decoding processing unit 705 performs Huffman decoding processing or arithmetic decoding processing that corresponds to the encoded RAW image, based on the control of the control unit 111.

3-2 Sequence of Operations of Follow-Up Development Processing

The operational flow at the time of follow-up development processing by the control unit 111 will be described with reference to FIG. 8A. However, the operation other than the RAW encoding processing is the same as that of the first embodiment, and thus only the RAW encoding processing will be described. Note that this processing starts when the control unit 111 of the digital camera 700 is instructed by a user to perform shooting. Furthermore, this processing is realized by the control unit 111 expanding a program stored in the ROM onto the work area of the RAM, and executing the program.

In step S801, the control unit 111 compares, based on the measured value obtained from the measurement unit 106, the total amount of data of the encoded RAW images recorded by the recording unit 107 with the total amount of data of the read encoded RAW images. Specifically, it is determined whether or not a difference between the total amount of data of the record encoded RAW image and the total amount of data of the read encoded RAW image is larger than a predetermined threshold Th. If the calculated difference is larger than the threshold Th, the control unit 111 determines that the follow-up development processing has not sufficiently been performed, and advances the procedure to step S802, whereas if the calculated difference is the threshold Th or less, the control unit 111 determines that the follow-up development processing has sufficiently been performed, and advances the procedure to step S803.

In step S802, the switch 701 is controlled based on the control of the control unit 111, so as to be switched to a Huffman coding unit 702 side, and the converted data is output to the Huffman coding unit 702 (execution of a Huffman coding mode).

In step S803, the switch 701 is controlled based on the control of the control unit 111, so as to be switched to an arithmetic coding unit 703 side, and the converted data is output to the arithmetic coding unit 703 (execution of an arithmetic coding mode).

In step S804, the Huffman coding unit 702 or the arithmetic coding unit 703 performs various types of encoding processing on the converted data input via the switch 701, and outputs the generated encoded RAW image.

In step S805, the recording unit 107 records the encoded RAW image input via the measurement unit 106 in the recording medium. Upon completion of the recording by the recording unit 107, the control unit 111 returns the procedure again to step S501, and ends the RAW encoding processing.

The following will explain, with reference to FIG. 8B, that a difference between the encoded RAW image data amount and the follow-up developed data amount after the encoding method has been switched becomes smaller than a threshold. FIG. 8B shows an encoded RAW image data amount 811, a follow-up developed data amount 812, and a development progress percentage 813, which has been described above, when the encoding method has been switched.

FIG. 8B shows two time periods in the lower portion thereof. Of the two time periods, the upper time period (encoding method in the encoding processing) shows an encoding method used in the corresponding time period. The lower time period (decoding method in the follow-up development processing) shows a decoding method that is operated in the decoding processing unit of the follow-up development processing in each time period.

It is shown that, for example, in the time period from time T1 to time T2, the arithmetic coding method is selected as an encoding method. It is shown that, in the time period from time T2 to time T3, which is a non-shooting time period, a decoding method in the decoding processing unit is operated by the arithmetic decoding unit.

Similarly, the following shows that in the time period from time T3 to time T4, the time period from time T5 to time T6, and the time period from time T7 to time T8, which are shooting time periods, the Huffman coding method is selected as an encoding method. Furthermore, in the time period from time T4 to time T5, which is a non-shooting time period, the decoding processing of the decoding processing unit is operated by the arithmetic decoding unit. In the time period from time T6 to T7 and the time period from time T8 to time T9, which are non-shooting time periods, the decoding processing of the decoding processing unit is operated by the Huffman decoding unit.

The encoded RAW image encoded in the time period from time T1 to time T2 will be subjected to the follow-up development processing in the time period from time T2 to time T3 immediately thereafter, which is a non-shooting time period. FIG. 8B shows that the follow-up development processing is performed in the order of generation of the encoded RAW images.

At time T1, the encoded RAW image data amount 811 and the follow-up developed data amount 812 match each other, and thus the state is realized in which no encoded RAW image is included in the recording unit 107 and all the encoded RAW images were subjected to the follow-up development processing. The arithmetic coding is adopted as encoding processing in the RAW encoding until time T2.

At time T3, a difference between the encoded RAW image data amount 811 and the follow-up developed data amount 812 exceeds the threshold Th, and it is thus shown that the encoding method in the raw encoding unit from times T3 onward is switched from the arithmetic coding to the Huffman coding.

At time T3, the encoding method is switched from the arithmetic coding to the Huffman coding, the encoded RAW image that was Huffman encoded between time T3 and time T4 is read out from the recording unit 107 during the time period from time T6 to time T7. Since the follow-up developed data in the time period from time T6 to time T7 is Huffman-encoded, the follow-up developed data amount 812 per unit time is increased as compared with the follow-up developed data amount before time T5. As a result, from times T6 onwards, the development progress percentage 813 is increased, and a difference 814 between the encoded RAW image data amount 811 and the follow-up developed data amount 812 is smaller than the threshold Th at time T10.

The arithmetic coding has higher compression rate than that of the Huffman coding, and the encoded RAW image data amount that is generated is smaller. On the other hand, the amount of data of the Huffman-encoded RAW image that can be decoded in the decoding processing within unit time is larger.

That is, follow-up developed data amount that is increased per unit time when the Huffman coding processing and Huffman decoding processing are applied is larger than the encoded RAW image data amount that is increased per unit time when the arithmetic coding processing and the arithmetic decoding processing are applied. This is because, in the case of the arithmetic decoding processing, the amount of data that can be decoded per unit time is determined due to an algorithm for updating the occurrence probability for each bit of the intermediately encoded data that is generated during the decoding processing, and parallelization of the decoding processing is not possible due to the property of the algorithm.

According to the present embodiment, if a sufficient time for follow-up development processing can be ensured, the arithmetic coding is used to further reduce the encoded RAW image data amount, and if a sufficient time for follow-up development processing cannot be ensured, the encoding is switched to the Huffman coding processing. The decoding processing and the development processing with respect to the encoded RAW image are accelerated, by switching the encoding processing and the decoding processing to the Huffman coding method having a higher speed. Accordingly, it is possible to reduce the encoded RAW image recorded in the recording unit 107 even in a short non-shooting time period. That is, it is possible to record data that was encoded using an appropriate encoding method selected according to a free space of the recording medium in the recording unit 107, making it possible to mitigate the occurrence of a lack of capacity of the recording medium. Furthermore, an encoding method having a high compression rate can be used for the first shooting (from time T1 to time T2), and thus even if the first shooting takes a prolonged time, it is possible to mitigate the occurrence of a lack of the capacity of the recording medium.

Note that other various types of determination methods can be used for the determination in step S801 as to whether or not the follow-up development processing has sufficiently been performed, that is, whether or not the recorded encoded RAW images have sufficiently been read out. As a first modification, a time length of a non-shooting time period (for example, from time T2 to T3) is measured, and it is possible to determine, if the time length of the measured non-shooting time period is shorter than a predetermined threshold, that the follow-up development processing has not sufficiently been performed. As a second modification, the above-described development progress percentage (that is, the ratio of the encoded RAW image data amount to the follow-up developed data amount) is measured, and, if the measured development progress percentage is lower than a predetermined threshold, it is determined that the follow-up development processing has not sufficiently been performed. If it is determined using these determination method that the follow-up development processing has not sufficiently been performed, it is only needed to switch the encoding method to the Huffman coding.

Additionally, the above-described modifications of the determination method in step S801 are applicable also to the determination method in step S510 described in the first embodiment. That is, as a result of measurement of the time length and the development progress percentage in the non-shooting time period (for example, from time T2 to time T3), if it is determined that the follow-up development processing has not sufficiently been performed, it is only needed to apply the lossy encoding.

Fourth Embodiment

Hereinafter, a fourth embodiment will be described. In the third embodiment, switching of the encoding method is performed based on a difference between the total amount of data of the encoded RAW images recorded by the recording unit 107 and the total amount of data of the read encoded RAW image. In contrast, in the fourth embodiment, switching of the encoding method is performed according to whether or not all pieces of the encoded RAW image data recorded in a shooting time period have been read out in a non-shooting time period immediately after this shooting time period. Therefore, follow-up development processing according to the present embodiment has the same configuration except for the determination method in the RAW encoding processing. Note that the same reference numerals are given to the same configurations, and redundant descriptions thereof are omitted while describing mainly differences.

4-1 Sequence of Operations of RAW Encoding Processing

A sequence of operations of RAW encoding processing according to the fourth embodiment will be described with reference to FIG. 9A.

In step S901, the control unit 111 determines, based on measured values obtained from the measurement unit 106, whether or not all pieces of the encoded RAW image data recorded in a shooting time period by the recording unit 107 have been read out in a non-shooting time period immediately after this shooting time period, and have been subjected to follow-up development processing. If all the pieces of the encoded RAW image data have not been read out in the non-shooting time period, the control unit 111 determines that there is not a sufficient time for follow-up development processing, and advances the procedure to step S802 in order to apply Huffman coding. On the other hand, if all the pieces of the encoded RAW image data have been read out in the non-shooting time period, the control unit 111 determines that there is a sufficient time for follow-up development processing, and advances the procedure to step S803 in order to apply arithmetic coding. Note that descriptions of the procedure from steps S802 onward are redundant and thus omitted.

Figure 9B:
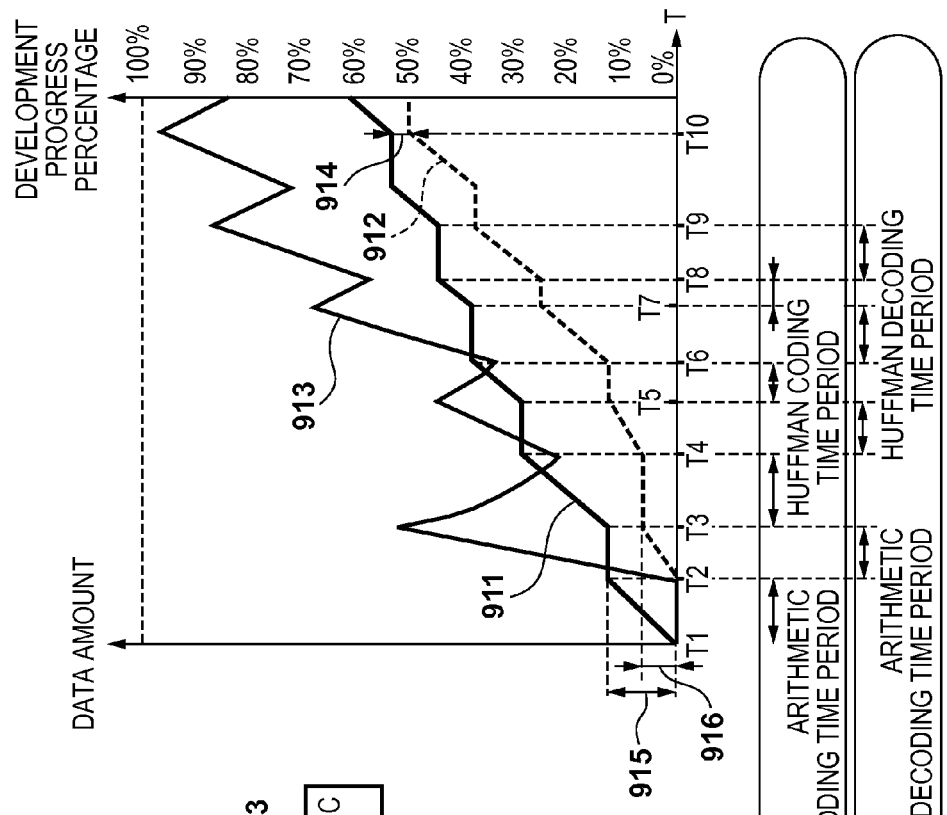
FIG. 9B is a diagram showing changes in the amount of data in a recording unit according to the fourth embodiment.
Figure 9A:
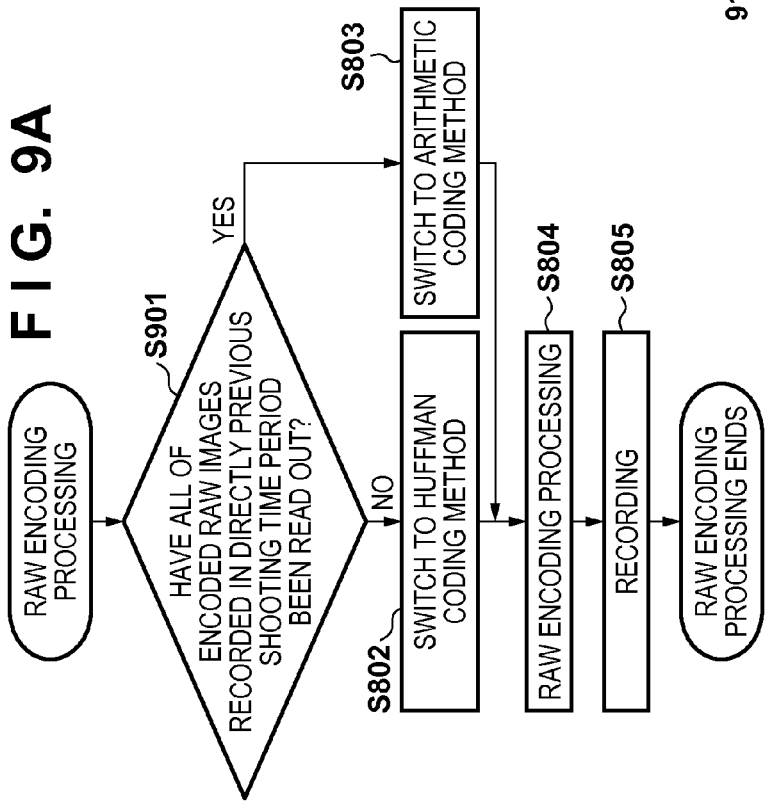
FIG. 9A is a flowchart showing a sequence of operations of RAW encoding processing according to a fourth embodiment.

FIG. 9B shows an encoded RAW image data amount 911, a follow-up developed data amount 912, and a development progress percentage 913.

The amount of data of the encoded RAW images that were generated in the time period from time T1 to time T2 is the encoded RAW image data amount 915 in FIG. 9B, and the amount of the follow-up developed data that was subjected to follow-up development processing in the time period from time T2 to time T3 is the follow-up developed data amount 916. At time T3, the encoded RAW image data amount 915 is larger than the follow-up developed data amount 916. Therefore, this shows that all pieces of the encoded RAW image data recorded by the recording unit 107 in the shooting time period from time T1 to time T2 have not been read out in the non-shooting time period from time T2 to time T3 immediately after the shooting time period. Therefore, the control unit 111 switches the encoding method from time T3 from the arithmetic coding method to the Huffman coding method.

By switching, at time T3, the encoding method from the arithmetic coding method to the Huffman coding method, the encoded RAW images that were Huffman-encoded in the time period from time T3 to time T4 are read out in the time period from time T6 to time T7. That is, by determining whether or not there was a sufficient time for follow-up development processing immediately after the shooting time period, it is possible to switch the encoding method immediately (at time T3) if the follow-up development processing was not sufficiently performed. Accordingly, it is possible to prevent the decoding processing from being elongated (that is, the decoding processing being performed within the period from time T4 to time T5) relative to the encoding method before switching, and to start the decoding processing early (that is, from time T6).

Then, in the time period from time T6 to time T7, the follow-up developed data amount per unit time is increased due to being Huffman encoded. As a result, the development progress percentage 913 increases from time T6, and a difference 914 between the encoded RAW image data amount 911 and the follow-up developed data amount 912 is decreased at time T10.

In the present embodiment, when an encoding method in which the encoding and decoding processing is entirely performed at a high speed is selected, it is determined whether or not all the pieces of the encoded RAW images that were recorded in the shooting time period have been read out in the time period immediately after the shooting time period. Accordingly, it is possible to start the decoding processing early, mitigating the occurrence of a lack of capacity of the recording medium.

Fifth Embodiment

Hereinafter, a fifth embodiment will be described. In the fifth embodiment, if an encoded RAW image that was Huffman-encoded is included in the recording medium of the recording unit 107 at the start of the follow-up development processing, the Huffman-encoded encoded RAW image will be subjected to follow-up development processing on a priority basis. Accordingly, a digital camera 700 according to the present embodiment has the same configuration as other embodiments, the configuration of the follow-up development processing is the same as other embodiments, except for the configuration in which the recorded encoded RAW image is decoded. Note that the same reference numerals are given to the same configurations, and redundant descriptions thereof are omitted while describing mainly differences.

5-1 Sequence of Operations of Follow-Up Development Processing

Figure 10:
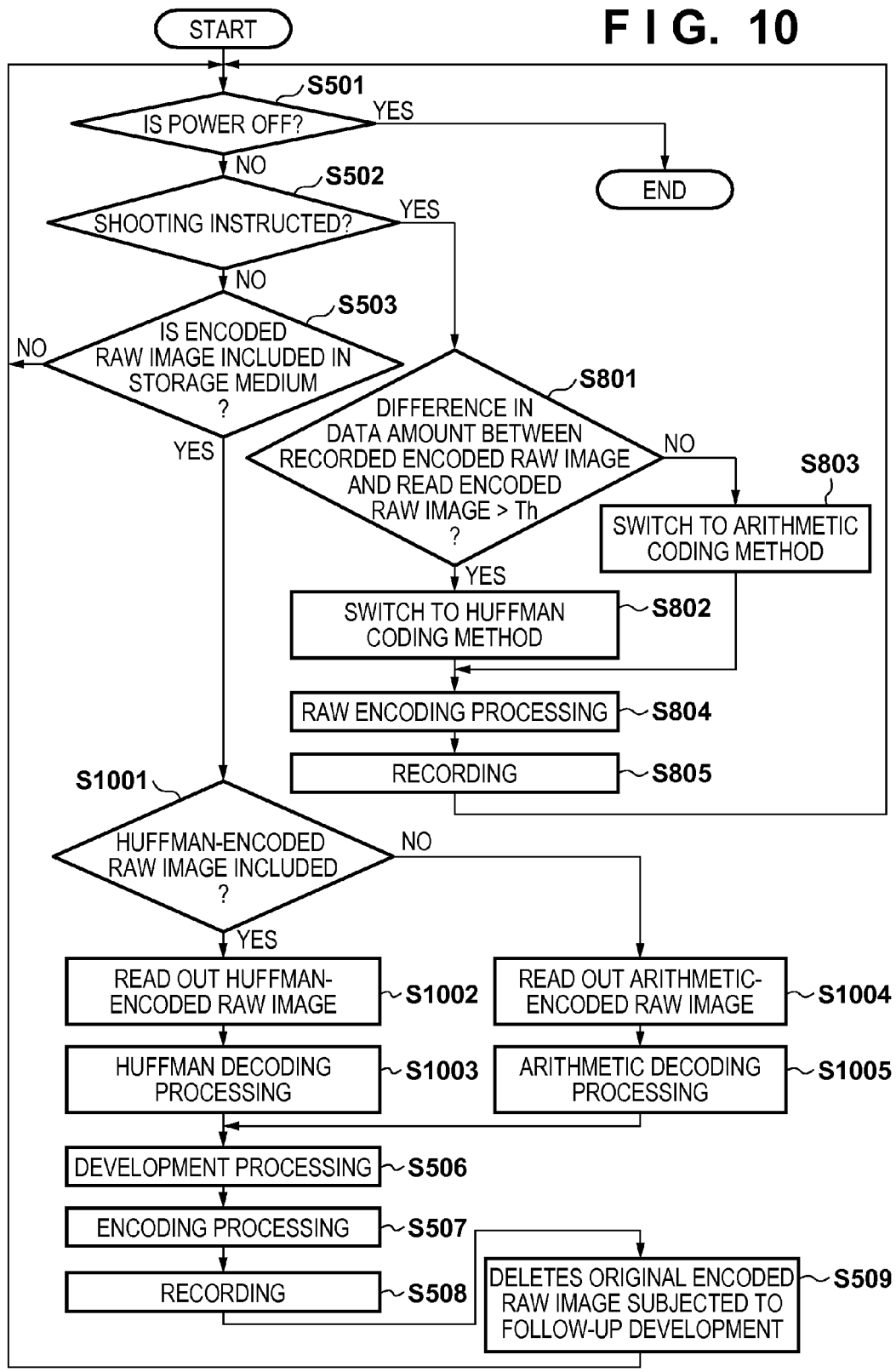
FIG. 10 is a flowchart showing a sequence of operations of RAW encoding processing according to a fifth embodiment.

A sequence of operations of the follow-up development processing according to the fifth embodiment will be described with reference to FIG. 10.

In step S1001, the control unit 111 determines whether or not an encoded RAW image that was encoded by a Huffman coding method is included in the encoded RAW images recorded in the recording medium of the recording unit 107. The control unit 111 acquires information indicating encoding methods of the respective recorded encoded RAW images from the recording unit 107, and determines whether or not there is an encoded RAW image that was encoded by the Huffman coding method. Note that the information indicating the encoding methods is recorded in a header or the like at the time of recording the encoded RAW images, and the recording unit 107 outputs the information indicating the respective encoding methods to the control unit 111. If it is determined that there is an encoded RAW image that was encoded by the Huffman coding method, the control unit 111 advances the procedure to step S1002, whereas if it is determined that there is no encoded RAW image, the control unit 111 advances the procedure to step S1004.

In step S1002, the control unit 111 reads out the encoded RAW image that was encoded by a Huffman coding method from the recording unit 107, and in step S1003, the control unit 111 applies Huffman decoding processing to the read encoded RAW image to decode the RAW image. Note that if there are a plurality of encoded RAW images that were encoded by the Huffman coding method, the control unit 111 repeats the procedure in steps S1002 and S1003, performs decoding processing on a priority basis on the encoded RAW images recorded by the Huffman coding method.

In step S1004, the control unit 111 reads out an encoded RAW image encoded by an arithmetic coding method from the recording unit 107, and in step S1005, the control unit 111 applies arithmetic decoding processing to the read encoded RAW image to decode the RAW image.

The procedure thereafter is the same as the procedure from the above-described development processing (S506), and description thereof is omitted.

Figure 11:
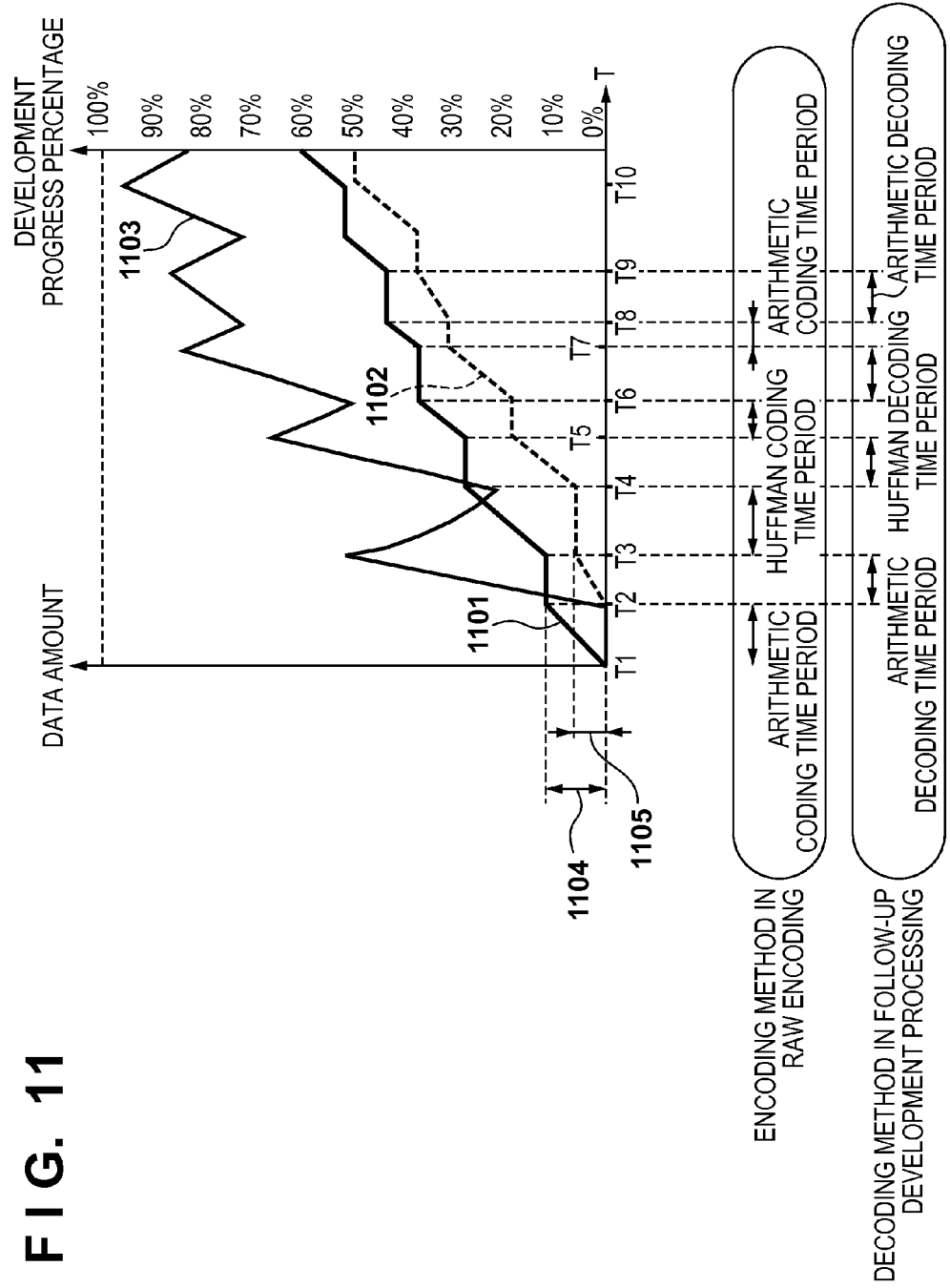
FIG. 11 is a diagram showing changes in the amount of data in a recording unit according to the fifth embodiment.

The following will describe improvement in the development progress percentage when an encoded RAW image encoded by a Huffman coding method is subjected to follow-up development in a priority basis, with reference to FIG. 11.

FIG. 11 shows changes of an encoded RAW image data amount 1101, a follow-up developed data amount 1102, and a development progress percentage 1103, when an encoded RAW image encoded by a Huffman coding method is subjected to follow-up development on a priority basis.

In a time period from time T1 to time T2, the arithmetic coding method is applied as an encoding method. The encoded RAW images shot until time T2 are encoded by an arithmetic coding method. Furthermore, at time T3, since the above-described condition determination in step S901 is performed and it is determined that all the encoded RAW image data amount between time T1 and time T2 have not been read out, the encoding method by the RAW encoding unit from time T3 is switched to a Huffman coding method. Note that as shown in FIG. 11, a follow-up developed data amount (1105) subjected to the follow-up development processing in the time period from time T2 to time T3 is lower than an encoded RAW image data amount (1104) generated in the time period from time T1 to time T2.

On the other hand, in the follow-up development processing, since only an encoded RAW image encoded by the arithmetic coding is included in the recording medium of the recording unit 107 in the time period from time T2 to time T3, arithmetic decoding processing is performed.

At the start of the non-shooting time period from time T4 to time T5, an encoded RAW image encoded by the arithmetic coding in the time period from time T1 to time T2 and encoded RAW image encoded by a Huffman coding in the time period from time T3 to time T4 is included in the recording medium of the recording unit 107. Therefore, in the above-described step S1001, the encoded RAW image encoded by Huffman coding having a high decoding processing speed is read out from the recording unit 107 and is subjected to Huffman decoding processing. In the time period from time T4 to time T5, Huffman decoding processing is performed, and thus the amount of data that can be decoded per unit time is larger than that in the case where arithmetic decoding processing is performed. Accordingly, the inclination of the follow-up developed data amount in the time period from time T4 to time T5 in which Huffman decoding processing is performed is larger than the inclination of the follow-up developed data amount from time T2 to time T3 in which arithmetic decoding processing is performed, and the development progress percentage 1103 increases from the vicinity of time T7.

In the present embodiment, if an encoded RAW image encoded by a Huffman coding method is included in the recording unit 107, the encoded RAW image is subjected to the follow-up development processing on a priority basis. Accordingly, the development progress percentage can be improved relative to the case where encoded RAW images are subjected to follow-up development processing in the order of being recorded as exemplified in FIG. 8B and FIG. 9B, and it is possible to reduce the data amount of the encoded RAW image recorded in the recording medium more rapidly. That is, it is possible to mitigate the occurrence of a lack of capacity of the recording medium.

Sixth Embodiment

Figure 12:
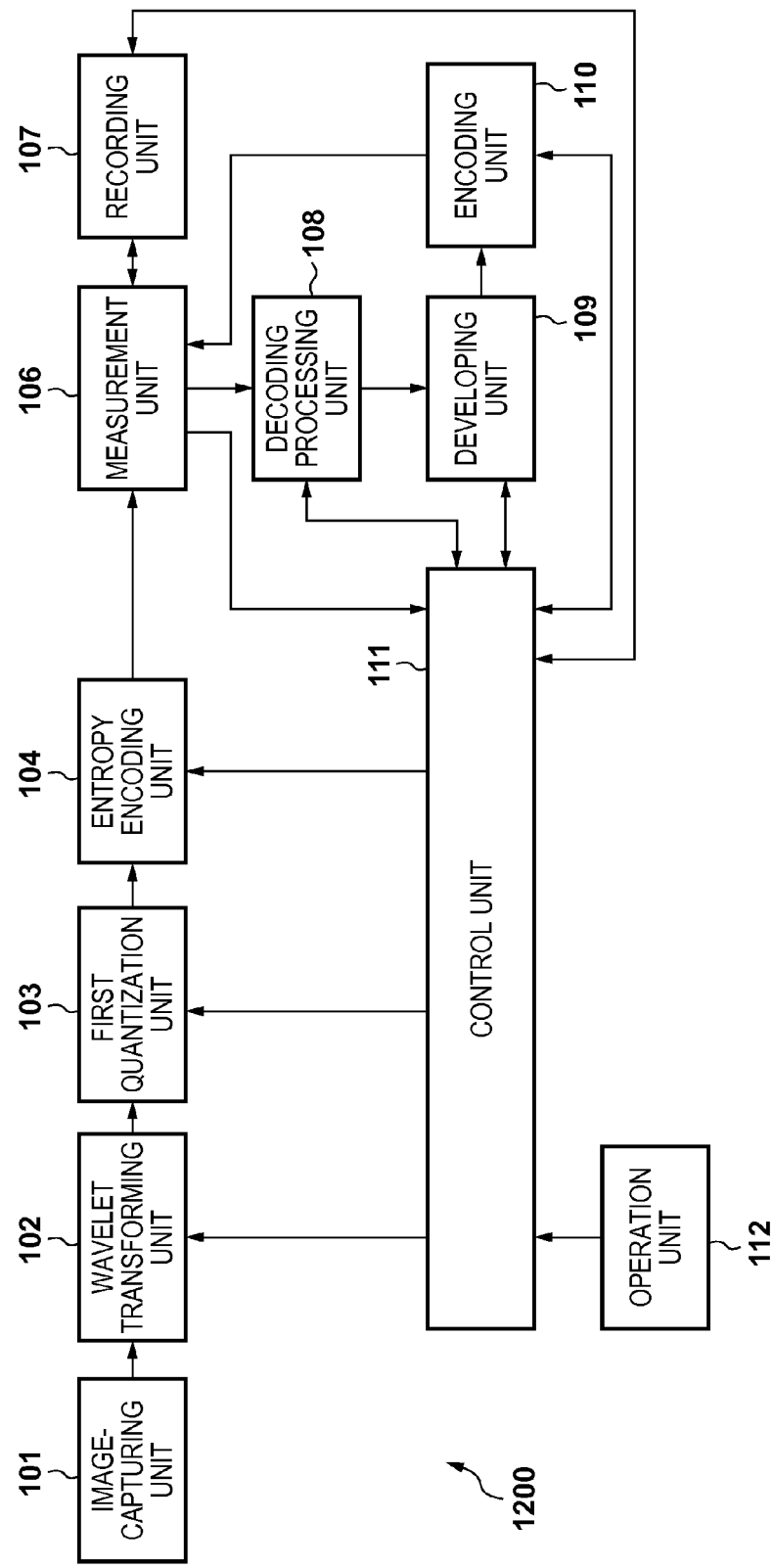
FIG. 12 is a block diagram showing an example of a functional configuration of a digital camera serving as an example of an image capturing apparatus according to a sixth embodiment.

The following will describe a sixth embodiment with reference to FIG. 12. FIG. 12 is a diagram illustrating an example of a functional configuration of a digital camera 1200 serving as an example of an image capturing apparatus of the present embodiment. However, in FIG. 12, the blocks denoted by the reference numerals of FIG. 1 are the same as the blocks shown in FIG. 1 and thus descriptions thereof are omitted.

The digital camera 1200 shown in FIG. 12 is the same as that of FIG. 1 except for being not provided with a second quantization unit. Similarly to the first embodiment, the image-capturing unit 101 generates RAW image data as captured-image data, and the wavelet transforming unit 102 performs wavelet transforming thereon. The first quantization unit 103 performs quantizing processing on the converted data output from the wavelet transforming unit 102. The first quantization unit 103 performs quantizing processing based on a control signal from the control unit 111. That is, the first quantization unit 103 does not perform quantizing processing if the lossless encoding method is applied, and performs quantizing processing if the lossy encoding method is applied, reducing the data amount of the converted data. Furthermore, a quantization value when the quantizing processing is performed, that is, a value by which the converted data is divided is input from the control unit 111. Then, the first quantization unit 103 outputs the quantized converted data.

The entropy encoding unit 104 performs variable length encoding and data compression on the converted data output from the first quantization unit 103, and outputs the compressed data. Golomb-Rice encoding and run length encoding are performed as an entropy encoding method.

In the present embodiment, if the lossless encoding method is applied, the wavelet transforming unit 102 does not execute wavelet transforming and the first quantization unit 103 does not execute quantizing processing. That is, RAW image data is supplied to the entropy encoding unit 104 substantially directly from the image-capturing unit 101, and Golomb-Rice encoding and run length encoding processing are performed by the entropy encoding unit 104.

On the other hand, if the lossy encoding method is applied, the wavelet transforming unit 102 performs wavelet transforming and the first quantization unit 103 performs quantizing processing. At that time, the converted data with the lowest-frequency band of the wavelet-transformed converted data is not subjected to quantizing processing, and is directly input into the entropy encoding unit 104. At that time, since the converted data that was input corresponds to a reduced image from the image-capturing unit 101, the entropy encoding unit 104 generates an estimation coefficient in the Golomb-Rice encoding with reference to the peripheral coefficient of the image, and performs Golomb-Rice encoding on an estimation difference coefficient. A known method is applied to the method for referencing a coefficient and generating an estimation coefficient.

Converted data other than the converted data with the lowest-frequency band is frequency components extracted by wavelet transforming, and thus such converted data is subjected to Golomb-Rice encoding and run length encoding without reference to a peripheral coefficient.

In the present embodiment, after entropy encoding, entropy-encoded data is supplied to the measurement unit 106 without being subjected to quantization (second quantization/data reduction processing). The measurement unit 106 measures the amount of data that is written by the recording unit 107 and the amount of data that is read out by the recording unit 107. Descriptions thereafter are the same as the description made with reference to FIG. 1, and thus are omitted.

Accordingly, the present embodiment provides a configuration that does not necessitate quantization (second quantization unit) after entropy encoding and inputs, as described above, encoded data into processing performed by the measurement unit 106 and thereafter. Similarly to the first embodiment, by making such a configuration, it is possible to record data that was encoded by an appropriate encoding method selected according to a free space of the recording medium, mitigating the occurrence of a lack of the capacity of the recording medium. Therefore, by realizing a simpler configuration and mitigating the processing load, it is possible to improve the entire throughput of the processing from image-capturing to recording.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-123813, filed Jun. 16, 2014 and 2015-085387, filed Apr. 17, 2015, which are hereby incorporated by reference herein in their entirety.

What is claimed is:

1. An image capturing apparatus comprising:
    an image-capturing unit configured to acquire RAW image data indicating a pre-development image from an image signal that was captured by an image sensor;
    recording unit configured to encode the RAW image data by a predetermined encoding method and record the encoded RAW image data in a recording medium;
    a developing unit configured to read out the encoded RAW image data from the recording medium and develop the read encoded RAW image data; and
    a control unit configured to compare an amount of the encoded RAW image data that was recorded in a shooting time period by the image-capturing unit with an amount of the encoded RAW image data that was read out from the recording medium so as to be used in development by the developing unit, and to control an encoding method by which the RAW image data is encoded according to a comparison result.

2. The apparatus according to claim 1, wherein the control unit sets a first encoding method if the comparison result has a predetermined relationship, and a second encoding method so as to reduce the amount of the encoded RAW image data recorded in the recording unit, if the comparison result does not have a predetermined relationship.

3. The apparatus according to claim 2, wherein the control unit sets, if the comparison result does not have the predetermined relationship, the second encoding method that reduces the amount of the encoded RAW image data recorded in the shooting time period relative to that when the first encoding method is used based on a difference in compression rate.

4. The apparatus according to claim 3, wherein the first encoding method is lossless encoding, and the second encoding method is lossy encoding.

5. The apparatus according to claim 2, wherein the control unit sets the second encoding method so that the amount of the encoded RAW image data that is read out from the recording medium increases when the developing unit performs development, if the comparison result does not have the predetermined relationship.

6. The apparatus according to claim 5, wherein the first encoding method is arithmetic coding, and the second encoding method is Huffman coding.

7. The apparatus according to claim 2, wherein the predetermined relationship is a relationship in which a difference between the amount of the encoded RAW image data that was recorded in the shooting time period and the amount of the encoded RAW image data that was read out from the recording medium so as to be used in development by the developing unit is smaller than a predetermined data amount.

8. The apparatus according to claim 2, wherein the predetermined relationship is a relationship in which a ratio of the amount of the encoded RAW image data that was read out from the recording medium so as to be used in development by the developing unit to the amount of the encoded RAW image data recorded in the shooting time period is larger than a predetermined ratio.

9. The apparatus according to claim 2, wherein the predetermined relationship is a relationship in which a time length in which the encoded RAW image data is read out from the recording medium so as to be used in development by the developing unit is longer than a predetermined time length.

10. The apparatus according to claim 2, wherein the predetermined relationship is a relationship in which, of amounts of the encoded RAW image data that are acquired for respective times of shooting and recorded in the shooting time period, all pieces of encoded RAW image data that were recorded in a directly previous shooting time period are read out from the recording medium so as to be used in development by the developing unit.

11. The apparatus according to claim 1, further comprising:
    a decoding unit configured to decode the encoded RAW image data that was read out from the recording medium so as to be used in development by the developing unit;
    wherein the developing unit develops the decoded RAW image data.

12. A control method of an image capturing apparatus having:
    an image-capturing step acquiring RAW image data indicating a pre-development image from an image signal that was captured by an image sensor;
    a recording step encoding the RAW image data by a predetermined encoding method and recording the encoded RAW image data in a recording medium;
    a developing step reading out the encoded RAW image data from the recording medium and developing the read encoded RAW image data; and
    a controlling step comparing an amount of the encoded RAW image data that was recorded in a shooting time period by the image-capturing unit with an amount of the encoded RAW image data that was read out from the recording medium so as to be used in development by the developing unit, and controlling an encoding method by which the RAW image data is encoded according to a comparison result.

13. A non-transitory computer-readable storage medium storing a program for causing a computer to function the each unit of the information processing apparatus according to claim 1.

* * * * *